United States Patent
Kawamura et al.

(10) Patent No.: US 10,037,486 B2
(45) Date of Patent: Jul. 31, 2018

(54) RF MODULE AND RF SYSTEM

(71) Applicant: Murata Manufacturing Co., Ltd., Nagaokakyo-shi, Kyoto-fu (JP)

(72) Inventors: Hideki Kawamura, Nagaokakyo (JP); Nobuhito Tsubaki, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 15/665,494

(22) Filed: Aug. 1, 2017

(65) Prior Publication Data
US 2017/0357886 A1 Dec. 14, 2017

Related U.S. Application Data

(63) Continuation of application No. PCT/JP2016/054639, filed on Feb. 18, 2016.

(30) Foreign Application Priority Data

Feb. 27, 2015 (JP) ................. 2015-037666

(51) Int. Cl.
*G06K 19/07* (2006.01)
*G06K 19/073* (2006.01)
*G06K 19/077* (2006.01)

(52) U.S. Cl.
CPC ... *G06K 19/07309* (2013.01); *G06K 19/0716* (2013.01); *G06K 19/0772* (2013.01); *G06K 19/07745* (2013.01); *G06K 19/07775* (2013.01)

(58) Field of Classification Search
CPC ............... G06K 19/07309; G06K 19/0716
USPC .......................................... 235/375
See application file for complete search history.

(56) References Cited

U.S. PATENT DOCUMENTS

| 7,272,982 B2 | 9/2007 | Neuhauser et al. |
| 7,408,460 B2 | 8/2008 | Crystal et al. |
| 7,443,292 B2 | 10/2008 | Jensen et al. |
| 7,463,144 B2 | 12/2008 | Crystal et al. |

(Continued)

FOREIGN PATENT DOCUMENTS

| JP | 2005-58534 A | 3/2005 |
| JP | 2005-293485 A | 10/2005 |

(Continued)

OTHER PUBLICATIONS

International Search Report issued in International Application No. PCT/JP2016/054639, dated Mar. 15, 2016.

(Continued)

*Primary Examiner* — Toan Ly
(74) *Attorney, Agent, or Firm* — Arent Fox LLP

(57) ABSTRACT

An RF system is provided that includes an RFID card and a reader-writer device. The RFID card includes a substrate, an RFIC element, an antenna coil, and a deformation sensor. The reader-writer device and the RFID card transmit and receive predetermined information between an antenna coil of the RFID card and an antenna coil of the reader-writer device through a magnetic field. The RFIC element transmits the first signal via the antenna coil when the deformation sensor does not detect bending deformation of the substrate, and the RFIC element transmits the second signal via the antenna coil when the deformation sensor detects the bending deformation of the substrate.

20 Claims, 24 Drawing Sheets

(56) References Cited

U.S. PATENT DOCUMENTS

| | | |
|---|---|---|
| 7,650,793 B2 | 1/2010 | Jensen et al. |
| 7,783,487 B2 | 8/2010 | Inoue et al. |
| 7,884,722 B2 | 2/2011 | Scheucher et al. |
| 7,962,315 B2 | 6/2011 | Jensen et al. |
| 8,061,622 B2 | 11/2011 | Nielsen et al. |
| 8,444,180 B2 | 5/2013 | Neuhauser et al. |
| 8,849,182 B2 | 9/2014 | Neuhauser et al. |
| 9,132,689 B2 | 9/2015 | Crystal et al. |
| 9,395,815 B2 | 7/2016 | Lim et al. |
| 2005/0272015 A1 | 12/2005 | Jensen et al. |
| 2005/0272016 A1 | 12/2005 | Jensen et al. |
| 2005/0272017 A1 | 12/2005 | Neuhauser et al. |
| 2005/0272018 A1 | 12/2005 | Crystal et al. |
| 2005/0272019 A1 | 12/2005 | Crystal et al. |
| 2005/0273802 A1 | 12/2005 | Crystal et al. |
| 2006/0003732 A1 | 1/2006 | Neuhauser et al. |
| 2006/0028953 A1 | 2/2006 | Jensen et al. |
| 2008/0010110 A1 | 1/2008 | Neuhauser et al. |
| 2008/0167861 A1 | 7/2008 | Inoue et al. |
| 2010/0225483 A1 | 9/2010 | Scheucher et al. |
| 2010/0320274 A1 | 12/2010 | Nielsen et al. |
| 2012/0249413 A1* | 10/2012 | Sugahara ............ G09G 5/00 345/156 |
| 2013/0336304 A1 | 12/2013 | Lim et al. |
| 2014/0049137 A1* | 2/2014 | Ando ............ G01B 7/16 310/330 |
| 2015/0317552 A1* | 11/2015 | Ishida ............ A63F 1/02 235/375 |

FOREIGN PATENT DOCUMENTS

| | | |
|---|---|---|
| JP | 2006-338480 A | 12/2006 |
| JP | 2007-535735 A | 12/2007 |
| JP | 2009-531769 A | 9/2009 |
| JP | 2010-520522 A | 6/2010 |
| JP | 5010405 B2 | 8/2012 |
| JP | 2013-131092 A | 7/2013 |
| JP | 2014-3604 A | 1/2014 |

OTHER PUBLICATIONS

Written Opinion of the International Searching Authority issued in International Application No. PCT/JP2016/054639, dated Mar. 15, 2016.

* cited by examiner

DISTORTION DISTRIBUTION AT TIME OF BENDING

DISTORTION DISTRIBUTION AT TIME OF BENDING

FIG. 8

| DEFORMED STATE | $V_M$ (OUTPUT DEFORMATION SENSOR) | TRANSMISSION CONTENT |
|---|---|---|
| BENDING (+a) | $+V_a$ | CARD NUMBER |
| BENDING (+b) | $+V_b$ | VALIDITY DATE |
| BENDING (−a) | $-V_a$ | PHONE NUMBER |
| BENDING (−b) | $-V_b$ | ADDRESS |

RF MODULE AND RF SYSTEM

CROSS-REFERENCE TO RELATED APPLICATIONS

The present application is a continuation of PCT/JP2016/054639 filed Feb. 18, 2016, which claims priority to Japanese Patent Application No. 2015-037666, filed Feb. 27, 2015, the entire contents of each of which are incorporated herein by reference.

TECHNICAL FIELD

The present disclosure relates to an RF module for performing radio communication, and an RF system including the RF module.

BACKGROUND

Currently, there has been widespread RF (Radio Frequency) systems that communicate between a reader-writer device and an RF module in a non-contact form, and in which the reader-writer device and the RF module transmit information to each other. As the RF module, for example, a card-type RF module has been widespread, which is used for a variety of applications such as an electronic money, a commutation pass, and an employee ID card. As the RF system, for example, a near field communication (NFC) has been widespread, which is one of radio communication standards. NFC has recently been expected to be mounted in a variety of mobile devices including a mobile phone terminal. A radio signal in a 13-MHz band (HF band) is in use in NFC.

Each of the reader-writer device and the RF module includes an antenna that transmits and receives the radio signal, and an RFIC element that is connected with the antenna and processes the radio signal. In this configuration, the reader-writer device and the RF module transmit and receive predetermined information between the antenna of the RF module and the antenna of the reader-writer device through one of a magnetic field and an electromagnetic field. Thus, by the RF module approaching the reader-writer device (master unit), the reader-writer device can read and rewrite information stored in the RF module.

Patent Document 1 (identified below) discloses an RFID (Radio Frequency Identification) tag as the RF module. By the RFID tag approaching the reader-writer device (master unit), the reader-writer device can read and rewrite information stored in the RFID tag.

Patent Document 1: Japanese Patent No. 5010405.

However, in the conventional RF module, just by the RF module approaching the reader-writer device (master unit), important information may be transmitted from the RF module to the reader unit. The important information is, for example, personal information of a user who owns the RF module, a card number of the user, a validity date of the card, and the like.

Thus, just by bringing the RF module of the user close to the reader-writer device (communication device), a malicious person can steal the personal information of the user or settle card transaction without permission.

SUMMARY

It is an object of the present disclosure to provide an RF module and an RF system which are capable of changing a signal to be transmitted, with the user's intention.

An exemplary RF module includes a substrate, a holding sensor, an antenna, and an RFIC element. A deformation sensor detects a holding state in which a biological body holds a substrate. The RFIC element is connected to the antenna. The RFIC element transmits a first signal via the antenna when the holding sensor does not detect the holding state. The RFIC element transmits a second signal via the antenna when the holding sensor detects the holding state.

In this configuration, the signal to be transmitted via the antenna changes to one of the first signal and the second signal depending on whether or not the user holds the substrate. That is, in this configuration, the signal to be transmitted can be changed with the user's intention.

Thus, for example, unless the substrate is held, the second signal is not transmitted from the RF module to the reader-writer device. In this context, for example, it is assumed that the first signal is a signal indicating ID information and the second signal is a signal indicating the foregoing important information. In this case, even if a malicious person brings the RF module of the user close to the reader-writer device, the malicious person cannot steal the personal information of the user or settle card transaction without permission. Accordingly, the RF module with this configuration can prevent the important information from being transmitted from the RF module to the reader-writer device without the user's intention.

Further, according to an exemplary aspect, the holding sensor detects bending deformation of the substrate. The RFIC element transmits the first signal via the antenna when the holding sensor does not detect the bending deformation of the substrate, and the RFIC element transmits the second signal via the antenna when the holding sensor detects the bending deformation of the substrate. In this configuration, the signal to be transmitted via the antenna changes to one of the first signal and the second signal depending on whether or not the user performs an operation to bend and deform the substrate. That is, in this configuration, the signal to be transmitted can be changed with the user's intention.

Thus, for example, unless the operation to bend and deform the substrate is performed, the second signal is not transmitted from the RF module to the reader-writer device. In this case, even if a malicious person brings the RF module of the user close to the reader-writer device, the malicious person cannot steal the personal information of the user or settle card transaction without permission. Accordingly, the RF module with this configuration can prevent the important information from being transmitted from the RF module to the reader-writer device without the user's intention.

Further, according to an exemplary aspect, the holding sensor detects twisting deformation of the substrate. The RFIC element transmits the first signal via the antenna when the holding sensor does not detect the twisting deformation of the substrate, and the RFIC element transmits the second signal via the antenna when the holding sensor detects the twisting deformation of the substrate.

In this configuration, the signal to be transmitted via the antenna changes to one of the first signal and the second signal depending on whether or not the user performs an operation to twist and deform the substrate. That is, in this configuration, the signal to be transmitted can be changed with the user's intention.

Thus, for example, unless the operation to twist and deform the substrate is performed, the second signal is not transmitted from the RF module to the reader-writer device. In this case, even if a malicious person brings the RF module of the user close to the reader-writer device, the malicious person cannot steal the personal information of the user or settle card transaction without permission. Accordingly, the RF module with this configuration can prevent the important information from being transmitted from the RF module to the reader-writer device without the user's intention.

Further, according to an exemplary aspect, the holding sensor detects minute vibration of the biological body which occurs when the biological body is touching the substrate. The RFIC element transmits the first signal via the antenna when the holding sensor does not detect the minute vibration of the biological body, and the RFIC element transmits the second signal via the antenna when the holding sensor detects the minute vibration of the biological body. The minute vibration of the biological body is, for example, a tremor of the biological body.

In this configuration, the signal to be transmitted via the antenna changes to one of the first signal and the second signal depending on whether or not the user touches the substrate. That is, in this configuration, the signal to be transmitted can be changed with the user's intention.

Thus, for example, unless the user touches the substrate, the second signal is not transmitted from the RF module to the reader-writer device. In this case, even if a malicious person brings the RF module of the user close to the reader-writer device, the malicious person cannot steal the personal information of the user or settle card transaction without permission. Accordingly, the RF module with this configuration can prevent the important information from being transmitted from the RF module to the reader-writer device without the user's intention.

Further, according to an exemplary aspect, it is preferable that the holding sensor detect a bending amount of the substrate, and the RFIC element transmit the second signal via the antenna when the holding sensor detects a bending amount of the substrate which is not smaller than a predetermined threshold. For example, the RFIC element transmits the first signal via the antenna when the holding sensor does not detect a bending amount of the substrate which is not smaller than the predetermined threshold.

In this configuration, the user can change the bending amount of the substrate to change a transmission content. The user can thus perform a diversified, intuitive bending operation on the RF module.

Further, according to an exemplary aspect, it is preferable that the holding sensor detect a bending direction of the substrate, and the RFIC element store first information and second information associated with the bending directions of the substrate, and transmit one of the first information and the second information in accordance with the bending direction of the substrate. In this configuration, the second signal is a signal indicating one of the first information and the second information.

In this configuration, the user can change the bending direction of the substrate to change a transmission content. The user can thus perform a diversified, intuitive bending operation on the RF module.

Further, according to an exemplary aspect, it is preferable that the holding sensor include a piezoelectric film, and the piezoelectric film be pasted to one main surface of the substrate.

In this configuration, the use of the piezoelectric film enables detection of the bending deformation with high sensitivity.

Further, according to an exemplary aspect, the substrate preferably has flexibility.

In this configuration, the substrate is easily bent and deformed.

Further, the RF system according to an exemplary aspect includes the one or more of the foregoing exemplary RF modules and a communication device. The communication device performs radio communication with the RF module and receives one of the first signal and the second signal transmitted from the RFIC element. Hence the communication device can read information indicated by the first signal and the second signal.

Since the RF system with this configuration includes the foregoing RF module, the RF system exerts a similar effect to that of the foregoing RF module.

According to the present disclosure, the signal to be transmitted can be changed with the user's intention.

BRIEF DESCRIPTION OF THE DRAWINGS

FIG. 8 is a diagram showing a relation between a deformed state and a transmission content in an RFID card provided in an RF system according to a second embodiment.

DETAILED DESCRIPTION OF EXEMPLARY EMBODIMENTS

Figure 1:
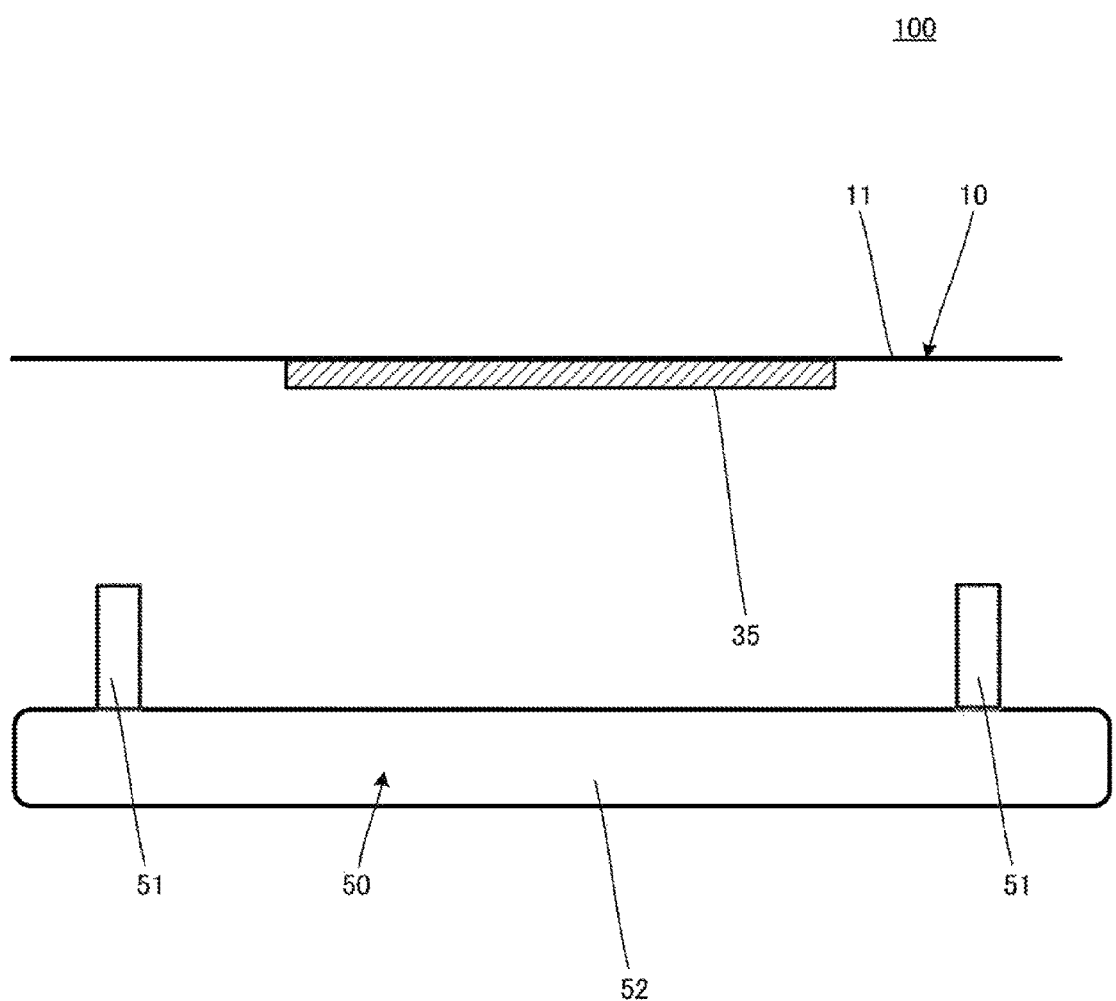
FIG. 1 is a side view of an RF system 100 according to a first embodiment.
Figure 2:
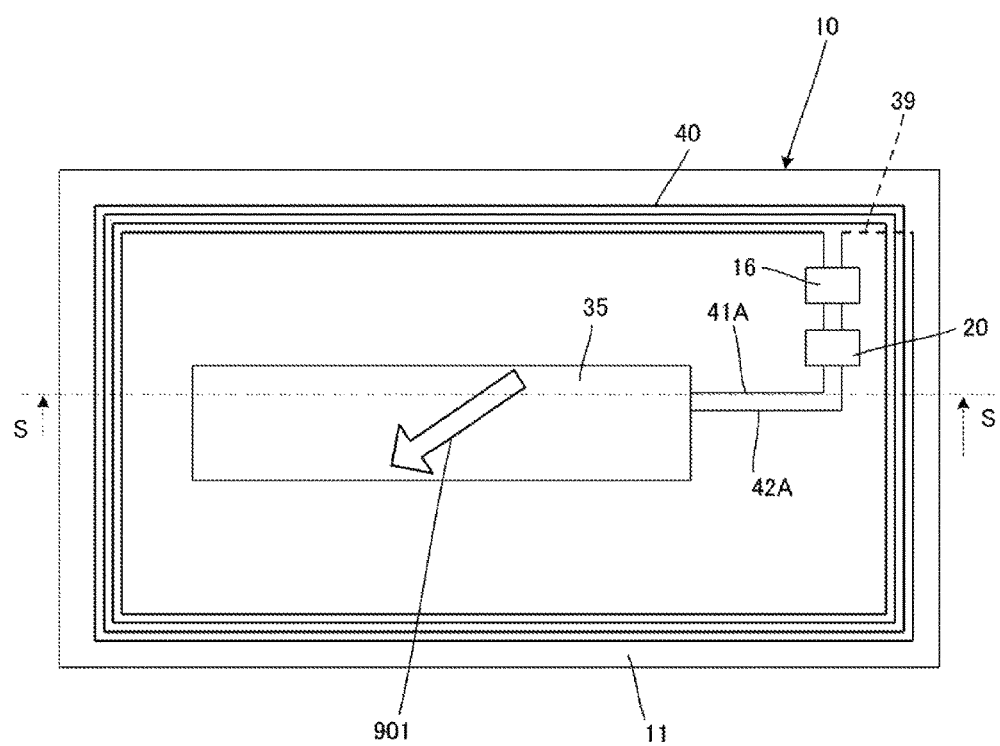
FIG. 2 is a front view of an RFID card 10 shown in FIG. 1.
Figure 3:
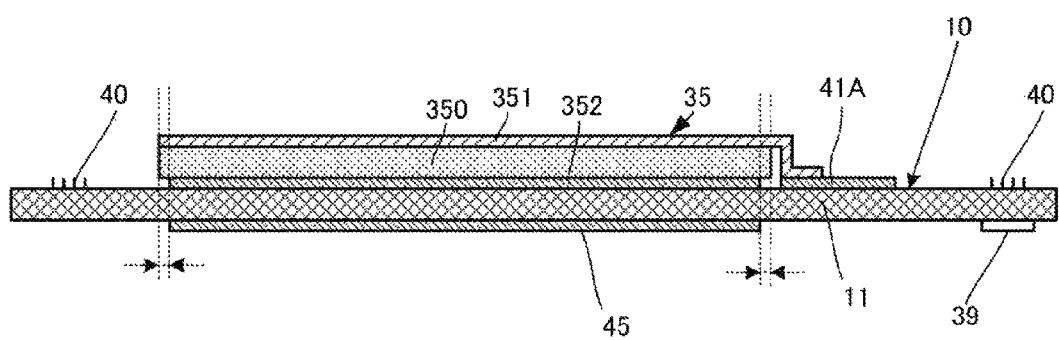
FIG. 3 is a sectional view along a line S-S shown in FIG. 2.

An RF system according to a first embodiment will be described with reference to the accompanying drawings. FIG. 1 is a side view of an RF system 100 according to the first embodiment. FIG. 2 is a front view of an RFID card 10 shown in FIG. 1. FIG. 3 is a sectional view along a line S-S shown in FIG. 2. As shown in FIG. 1, the RF system 100 includes an RFID card 10 and a reader-writer device 50.

The reader-writer device 50 is a so-called master unit and includes a spacer 51 and a body 52. The body 52 incorporates an antenna coil (not shown) that transmits and receives a radio signal, and an RFIC element (not shown) that is connected to the antenna coil and processes the radio signal. The spacer 51 is joined to the upper surface of the body 52 and extends vertically to the body 52.

The RFID card 10 is a so-called slave unit and includes a substrate 11, an RFIC element 16, an antenna coil 40, and a deformation sensor 35. As shown in FIGS. 1 and 2, the RFID card 10 has a size and a weight to a portable degree. Hence the user can carry the RFID card 10 while holding the RFID card 10 in his or her hand.

It is noted that the deformation sensor 35 corresponds to an example of the holding sensor according to an exemplary aspect.

The reader-writer device 50 and the RFID card 10 are each mounted with NFC. A radio signal in a 13-MHz band (HF band) is in use in NFC. The reader-writer device 50 and the RFID card 10 transmit and receive predetermined information between the antenna coil 40 of the RFID card 10 and the antenna coil of the reader-writer device 50 through a magnetic field.

It is noted that the reader-writer device 50 corresponds to an example of the communication device according to an exemplary aspect. Moreover, the RFID card 10 corresponds to an example of the RF module according to an exemplary aspect.

The substrate 11 is an insulating flexible plate, and formed of a polymer with relatively high strength, such as polyethylene terephthalate (PET), polyethylene naphthalate (PEN), polycarbonate (PC), acrylic resin (PMMA), or the like. Preferably, the substrate 11 has a platy shape. The substrate 11 has a thickness appropriately set in accordance with strength required for the substrate 11.

As shown in FIG. 2, the front surface of the substrate 11 is patterned with a circuit of the antenna coil 40, an analog circuit 20, wires 41A, 42A, and the like.

As shown in FIG. 3, the rear surface of the substrate 11 is patterned with a circuit of a shield electrode 45, a wire 39, and the like. The shield electrode 45 is connected to a reference potential to shield noise. The wire 39 is part of the antenna coil 40.

These circuits are formed by patterning metal foil such as copper foil or aluminum foil.

The front surface of the substrate 11 is mounted with the RFIC element 16 and the deformation sensor 35. The RFIC element 16 is connected to the antenna coil 40 and processes a radio signal. The RFIC element 16 has a timer circuit (not shown) and a flash memory (not shown). The RFIC element 16 stores important information and ID information in the flash memory.

It is noted that the important information is, for example, personal information of a user who owns the RFID card 10, a card number of the user, a validity date of the card, and the like. The personal information of the user is, for example, a birthday, an address, a phone number, and the like, of the user. The ID information is, for example, identification information indicating that the RFID card 10 corresponds to the reader-writer device 50.

Meanwhile, as shown in FIG. 3, the deformation sensor 35 includes a piezoelectric film 350, a GND electrode 351, and a signal electrode 352, each having a rectangular shape. The GND electrode 351 and the signal electrode 352 are respectively formed substantially throughout both main surfaces of the piezoelectric film 350. The GND electrode 351 is connected to the connection wire 41A, and the signal electrode 352 is connected to the connection wire 42A.

When the signal electrode 352, the wires 41A, 42A, and the antenna coil 40 are formed on the substrate 11, a manufacturing method in which these are disposed in the form of covering the piezoelectric film 350 in a plan view is preferred. Further, in this manufacturing method, the piezoelectric film 350 is preferably disposed in the form of covering the signal electrode 352. Consequently, this manufacturing method can prevent unnecessary electric connection between the GND electrode 351 and the signal electrode 352 at the time when the GND electrode 351 is pasted to the upper surface of the piezoelectric film 350.

Although the piezoelectric film 350 may simply be a film having piezoelectricity, it is preferably formed of uniaxially stretched polylactic acid (PLA), and more preferably formed of L-polylactic acid (PLLA).

The piezoelectric film 350 is formed of uniaxially stretched L-polylactic acid (PLLA). In the present embodiment, the piezoelectric film 350 is uniaxially stretched in a direction almost along a diagonal line of the rectangle (cf. an outlined arrow of a solid line in FIG. 2).

This direction will be hereinafter referred to as a uniaxially stretching direction 901. The uniaxially stretching direction 901 preferably forms an angle of 45° with respect to one of a longitudinal direction and a lateral direction of the piezoelectric film 350. However, the angle is not restricted to this, and the piezoelectric film 350 may simply be designed with an optimal angle in view of characteristics and a usage state of the piezoelectric film 350.

That is, the uniaxially stretching direction may simply be made to form the angle of 45° with respect to the bending direction. For example, when the sensor usage method is a method of bending the substrate 11 while holding the opposite sides thereof, the relation may simply be as shown in FIG. 2. When the sensor usage method is a method of bending the substrate 11 while holding the opposite angles thereof, the piezoelectric film may be disposed such that the uniaxially stretching axis of the piezoelectric film is along the side of the substrate 11. When detection is to be performed distinguishing between the case of bending the substrate 11 while holding the opposite sides thereof and the case of bending the substrate 11 while holding the opposite angles thereof, two deformation sensors may be installed on the substrate 11 and two piezoelectric films are superimposed.

It is noted that the angle is not restricted to exact 45°, but may be substantially 45°. Substantially 45° is an angle including about 45°±10, for example. It should be appreciated that the above angle is a design item to be appropriately decided based on the application of the deformation sensor in accordance with the entire design, such as bending detection accuracy.

PLLA described above is chiral polymer, and its main chain has a spiral structure. PLLA has piezoelectricity when PLLA is uniaxially stretched and molecules are oriented. By pressing of the flat film surface of the piezoelectric film, uniaxially stretched PLLA generates an electric charge. In this regard, an amount of the generated electric charge is uniquely decided based on an amount of displacement of the flat film surface displaced by a press in a direction orthogonal to the flat film surface. A piezoelectric constant of uniaxially stretched PLLA belongs to a group of very high piezoelectric constants among polymers.

Thus, the use of PLLA enables displacement of the piezoelectric film 350 due to bending of the substrate 11 with reliability and high sensitivity. That is, bending of the substrate 11 can be detected with reliability and a bending amount can be detected with high accuracy.

It is noted that a stretch ratio is preferably about three to eight times. Performing heat treatment after stretching encourages crystallization of extended chain crystal of polylactic acid, to improve the piezoelectric constant. Note that in the case of biaxial stretching, it is possible to obtain a similar effect to that of uniaxial stretching by making stretch ratios of the respective axes different. For example, when a sheet is stretched eight times in a given direction as the X axis direction and is stretched two times in the Y axis direction orthogonal to the X axis, it is possible to obtain an equivalent effect of the piezoelectric constant to a case where a sheet is uniaxially stretched four times in the X axis direction. Since a simply uniaxially stretched sheet is likely to be broken in a stretching axis direction, it is possible to increase the strength to some extent by biaxially stretching PLLA as described above.

Further, PLLA generates piezoelectricity as a result of molecule orientation processing by stretching or the like, and does not require polling processing unlike other polymers such as polyvinylidene fluoride (PVDF) or piezoelectric ceramics. That is, the piezoelectricity of PLLA not belonging to ferroelectrics is exhibited not by ion polarization as in ferroelectrics such as PVDF or lead zirconate titanate (PZT), but derives from a helical structure which is a characteristic structure of molecules.

Hence, PLLA does not exhibit pyroelectricity that is generated by other ferroelectric piezoelectric bodies. The piezoelectric constant of PVDF or the like temporally fluctuates and remarkably decreases depending on cases, whereas the piezoelectric constant of PLLA is temporally very stable. Thus, deformation of the piezoelectric film 350 due to bending of the substrate 11 can be detected with high sensitivity without being influenced by a surrounding environment.

Further, PLLA has a large piezoelectric output constant (=piezoelectric g constant, $g=d/\varepsilon^T$).

Accordingly, the use of PLLA enables detection of the deformation with very high sensitivity.

The signal electrode 352 and the shield electrode 45 are made of copper foil, aluminum foil, or the like, for example. The GND electrode 351 is made of a conductive non-woven film, for example. The GND electrode 351 is formed, for example, by printing silver on one main surface of the piezoelectric film 350.

Since the substrate 11 is greatly deformed, the GND electrode 351 and the signal electrode 352 are preferably formed using an organic electrode mainly composed of ITO, ZnO or polythiophene, an organic electrode mainly composed of polyaniline, a silver nanowire electrode, a carbon nanotube electrode, or some other electrode. The use of these materials enables formation of an electrode pattern with excellent flexibility.

In the above configuration, when the piezoelectric film 350 is deformed by the user bending the substrate 11, the deformation sensor 35 detects an electric charge, generated due to warping of the piezoelectric film 350, in the GND electrode 351 and the signal electrode 352.

Hereinafter, the circuit mounted in the RFID card 10 will be described.

Figure 4:
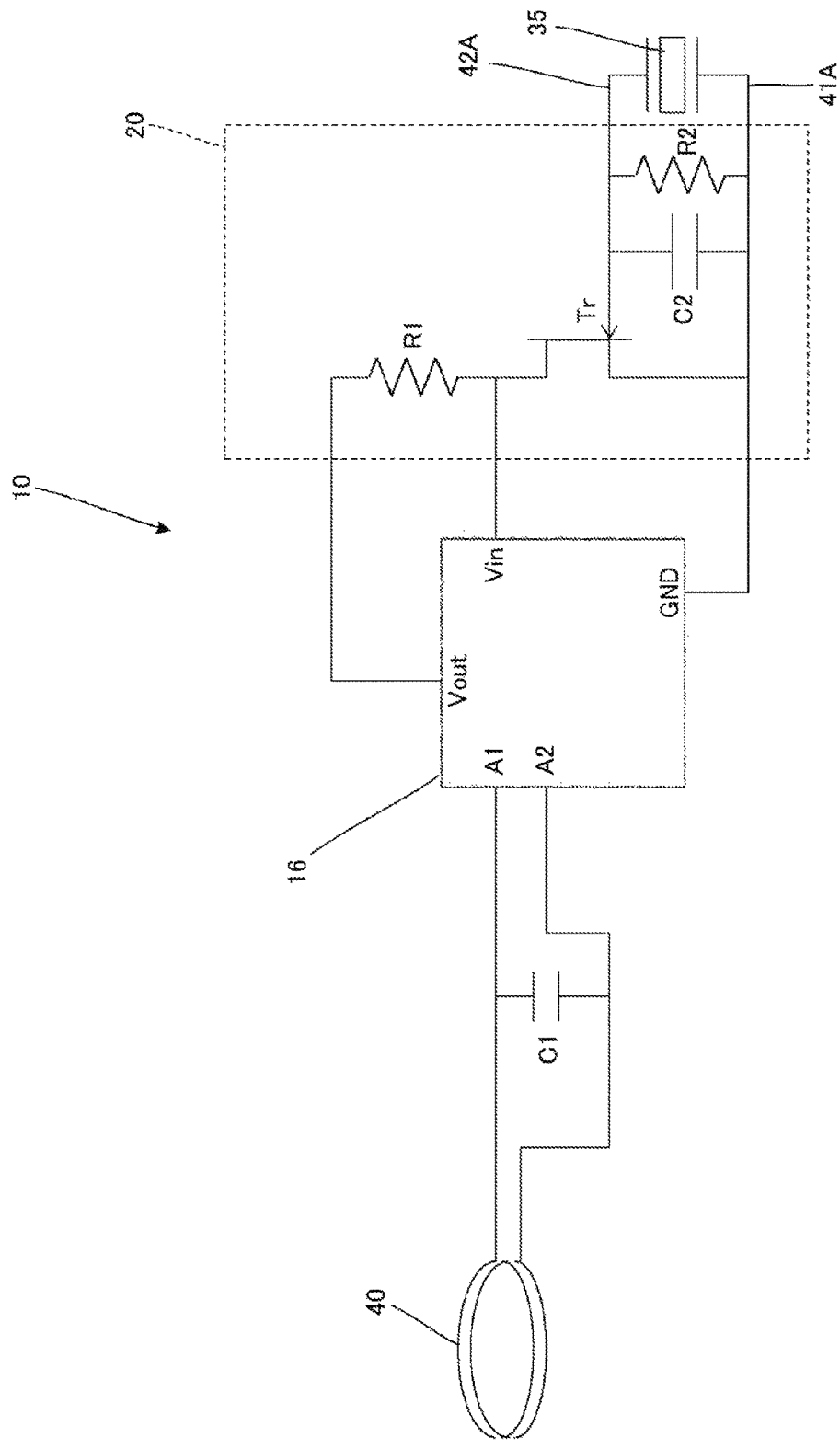
FIG. 4 is a circuit diagram showing an example of a circuit mounted in the RFID card 10 shown in FIG. 2.

FIG. 4 is a circuit diagram showing an example of the circuit mounted in the RFID card 10 shown in FIG. 2. As shown in FIG. 4, this circuit includes a plurality of discrete parts such as the antenna coil 40, the RFIC element 16, the deformation sensor 35, and a transistor Tr being JFET.

The RFIC element 16 has two antenna terminals A1, A2. The antenna terminals A1, A2 of the RFIC element 16 are connected with a capacitor C1 for adjusting a resonance frequency and both ends of the antenna coil 40.

Further, the RFIC element 16 has a power terminal $V_{OUT}$, a signal detection terminal $V_{IN}$, and a reference potential terminal GND. The RFIC element 16 generates a power supply voltage (e.g., +several V) from electric power obtained by the antenna coil 40, and outputs the generated power supply voltage from the power terminal $V_{OUT}$.

This power supply voltage is supplied to a drain terminal of the transistor Tr via a resistor R1. This power supply voltage is subjected to resistive voltage division by the resistor R1 and the transistor Tr, and the resistive partial voltage value (e.g., +1.5 V) is inputted into the signal detection terminal $V_{IN}$ of the RFIC element 16. The RFIC element 16 takes the resistive partial voltage value as the detected voltage value, and monitors it at the signal detection terminal $V_{IN}$.

As shown in FIG. 3, a voltage outputted from the deformation sensor 35, namely a voltage that is generated between the GND electrode 351 and the signal electrode 352 due to deformation of the piezoelectric film 350, is adjusted in a capacitor C2 and inputted into a gate terminal of the transistor Tr. An electric charge accumulated in the capacitor C2 is discharged by a discharging resistor R2.

Although the circuit shown in FIG. 4 has been described as an example here, this is not restrictive. In implementation, another circuit may be used.

Figure 5A:
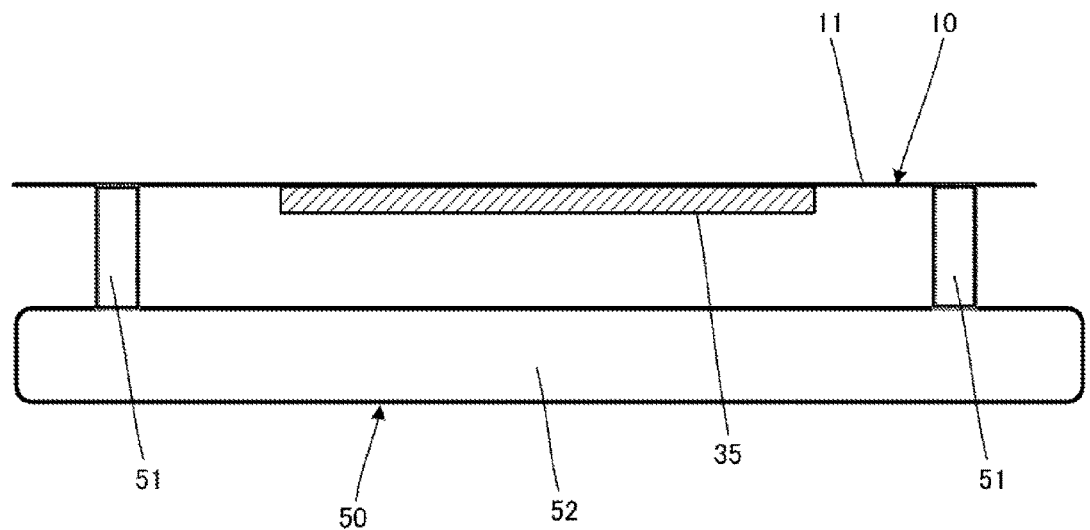
FIG. 5(A) is a side view of a state where the RFID card 10 shown in FIG. 1 is held over a reader-writer device 50.
Figure 5B:
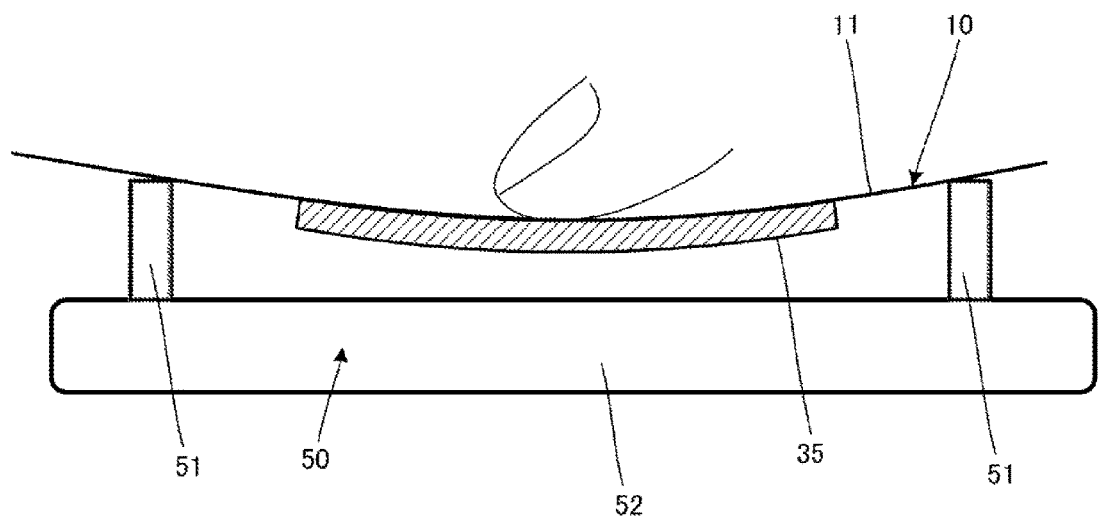
FIG. 5(B) is a side view of a state where the RFID card 10 shown in FIG. 1 is bent.

Next, a more detailed description will be given of the method for detecting the bending deformation of the substrate 11. FIG. 5(A) is a side view of a state where the RFID card 10 shown in FIG. 1 is mounted on the spacer 51 of the reader-writer device 50. That is, FIG. 5(A) is a side view of a state before the substrate 11 is bent. That is, FIG. 5(B) is a side view of a state where the substrate 11 is bent. FIG. 5(B) shows a case where the substrate 11 is bent along its longitudinal direction.

As shown in FIG. 5(A), when the bending deformation is 0, namely when no external force to cause bending is applied to the substrate 11, the main surface of the substrate 11 is in a flat state. In this case, the piezoelectric film 350 of the deformation sensor 35 does not extend or shrink, and a change in output voltage from the deformation sensor 35 due to the bending deformation does not occur.

Then, as shown in FIG. 5(B), when external force to cause bending is applied to the substrate 11, the substrate 11 is bent along the longitudinal direction. In this case, the piezoelectric film 350 of the deformation sensor 35 extends or shrinks depending on the bending direction and the surface of the substrate 11 to which the deformation sensor 35 is pasted.

Accordingly, a change occurs in the voltage outputted from the deformation sensor 35 due to the bending deformation. This enables the RFIC element 16 to detect the bending deformation of the substrate 11 at the signal detection terminal $V_{IN}$, as shown in FIG. 4.

In the above configuration, for example as shown in FIG. 1 and FIG. 5(A), when there is a difference in distance between the RFID card 10 and the reader-writer device 50, a power supply voltage outputted from the power terminal $V_{OUT}$ of the RFIC element 16 varies. Since the voltage outputted from the deformation sensor 35 is weak, the RFIC element 16 has difficulties in detecting a detected voltage value at the signal detection terminal $V_{IN}$.

The reader-writer device 50 then includes the spacer 51. The spacer 51 prevents the RFID card 10 from excessively approaching the reader-writer device 50 That is, the spacer 51 holds the distance constant between the RFID card 10 and the reader-writer device 50.

This can stabilize the power supply voltage outputted from the power terminal $V_{OUT}$ of the RFIC element 16 and facilitates the RFIC element 16 to detect the detected voltage value at the signal detection terminal $V_{IN}$.

Figure 6A:
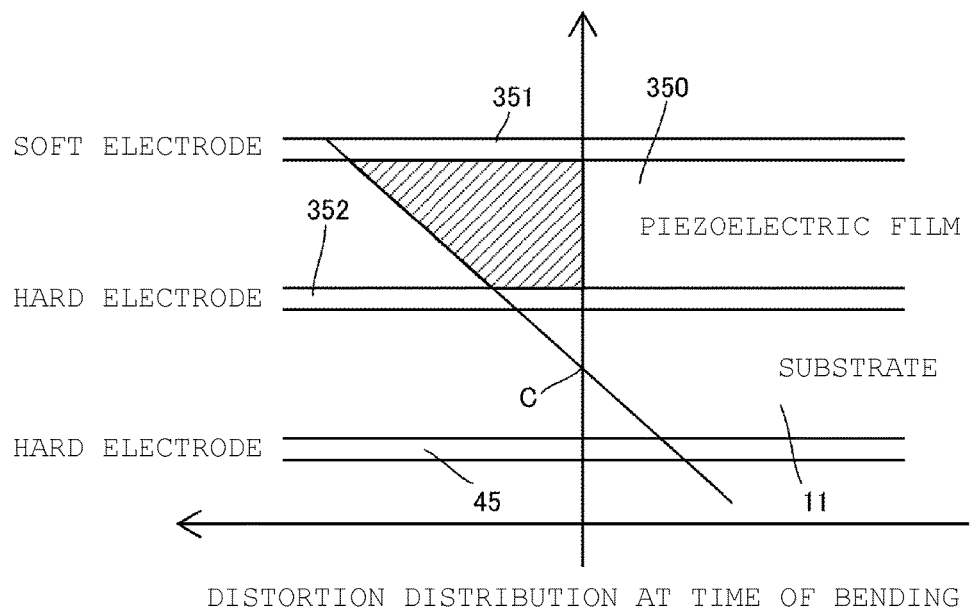
FIG. 6(A) is a diagram showing a distribution of distortion that occurs when the RFID card 10 shown in FIG. 1 is bent.
Figure 6B:
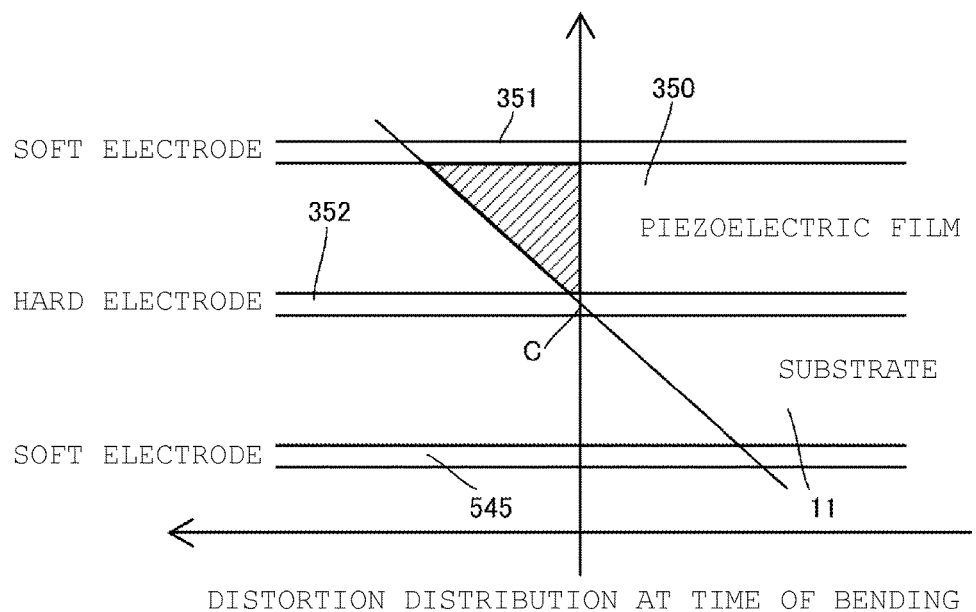
FIG. 6(B) is a diagram showing a distribution of distortion that occurs when an RFID card, which is a modification of the RFID card 10 shown in FIG. 1, is bent.

FIG. 6(A) is a diagram showing a distribution of distortion that occurs when the RFID card 10 shown in FIG. 1 is bent. FIG. 6(B) is a diagram showing a distribution of distortion that occurs when an RFID card, which is a modification of the RFID card 10 shown in FIG. 1, is bent. The RFID card shown in FIG. 6(B) is different from the RFID card 10 in terms of a shield electrode 545. Since the other configurations are the same, the description thereof is omitted.

In the RFID card 10 shown in FIG. 6(A), the signal electrode 352 and the shield electrode 45 are harder than the GND electrode 351. The signal electrode 352 and the shield electrode 45 have almost the same hardness. The signal electrode 352 and the shield electrode 45 are made of copper foil or aluminum foil, for example. The GND electrode 351 is made of a conductive non-woven film, for example. The GND electrode 351 is formed, for example, by printing silver on one main surface of the piezoelectric film 350.

Meanwhile, in the RFID card shown in FIG. 6(B), the signal electrode 352 is harder than the GND electrode 351 and a shield electrode 545. The GND electrode 351 and the shield electrode 545 have almost the same hardness. The shield electrode 545 is softer than the shield electrode 45. The shield electrode 545 is made of a conductive non-woven film, for example. The shield electrode 545 is formed, for example, by printing silver on one main surface of the piezoelectric film 350.

In the above configuration, in the RFID card 10, the hard electrode material such as copper or aluminum is strongly bonded to each surface of the substrate 11 not by a pressure-sensitive adhesive, but by an adhesive or thermal pressure bonding. For this reason, the substrate 11, the signal electrode 352, and the shield electrode 45 behave like one plate. Hence a stress neutral point C (a point at which stress is zero) at the time of bending the substrate 11 comes in the substrate 11.

Therefore, a distortion amount of the piezoelectric film 350 in the RFID card 10 shown in FIG. 6(A) is large as compared with that in the RFID card shown in FIG. 6(B). That is, the sensitivity of the deformation sensor 35 in the RFID card 10 shown in FIG. 6(A) is high as compared with that in the RFID card shown in FIG. 6(B).

It is noted that the softness may be more important than the sensitivity depending on the application, and in that case, a soft material is preferably used for each GNDs, as shown in FIG. 6(B).

Further, the antenna coil 40 (to be exact, all portions except for the wire 39 provided on the rear surface of the RFID card 10, for example) and the signal electrode 352 are formed on the front surface of the RFID card 10. Hence the antenna coil 40 (to be exact, all portions except for the wire 39 provided on the rear surface of the RFID card 10, for example) and the signal electrode 352 can be patterned in the same process. Advantageously, this can reduce manufacturing cost of the RFID card 10.

It is noted that, the signal electrode 352 may be formed simultaneously at the time of patterning the electrode such as the antenna coil on the substrate 11. In this case, since there is no need to use a pressure-sensitive adhesive or the like for pasting the deformation sensor 35 to the substrate 11, the deformation of the substrate 11 can be detected more accurately.

While the shield electrode 45 is not necessarily required, when present, the shield electrode 45 can shield noise from the outside. Further, patterning the shield electrode 45 at the same timing as the signal electrode 352 enables formation of the electrode with an accurate size and position, which enables effective shielding of noise with a small area. In one aspect, the electrode size can also be made as small as the NFC antenna, thereby enabling improvement in communication distance.

While the RFIC element 16 may be mounted on one of the main surfaces of the substrate 11, it may be disposed on the same surface as the surface on which the deformation sensor 35 is disposed. The placement on the same surface enables connection between the deformation sensor 35 and the RFIC element 16 without using an inter-layer connection conductor with a large conduction loss, such as a via. This can result in accurate detection of a weak signal from the deformation sensor 35.

Next, a description will be given of a scene where the RFID card 10 and the reader-writer device 50 are brought close to each other.

Figure 7:
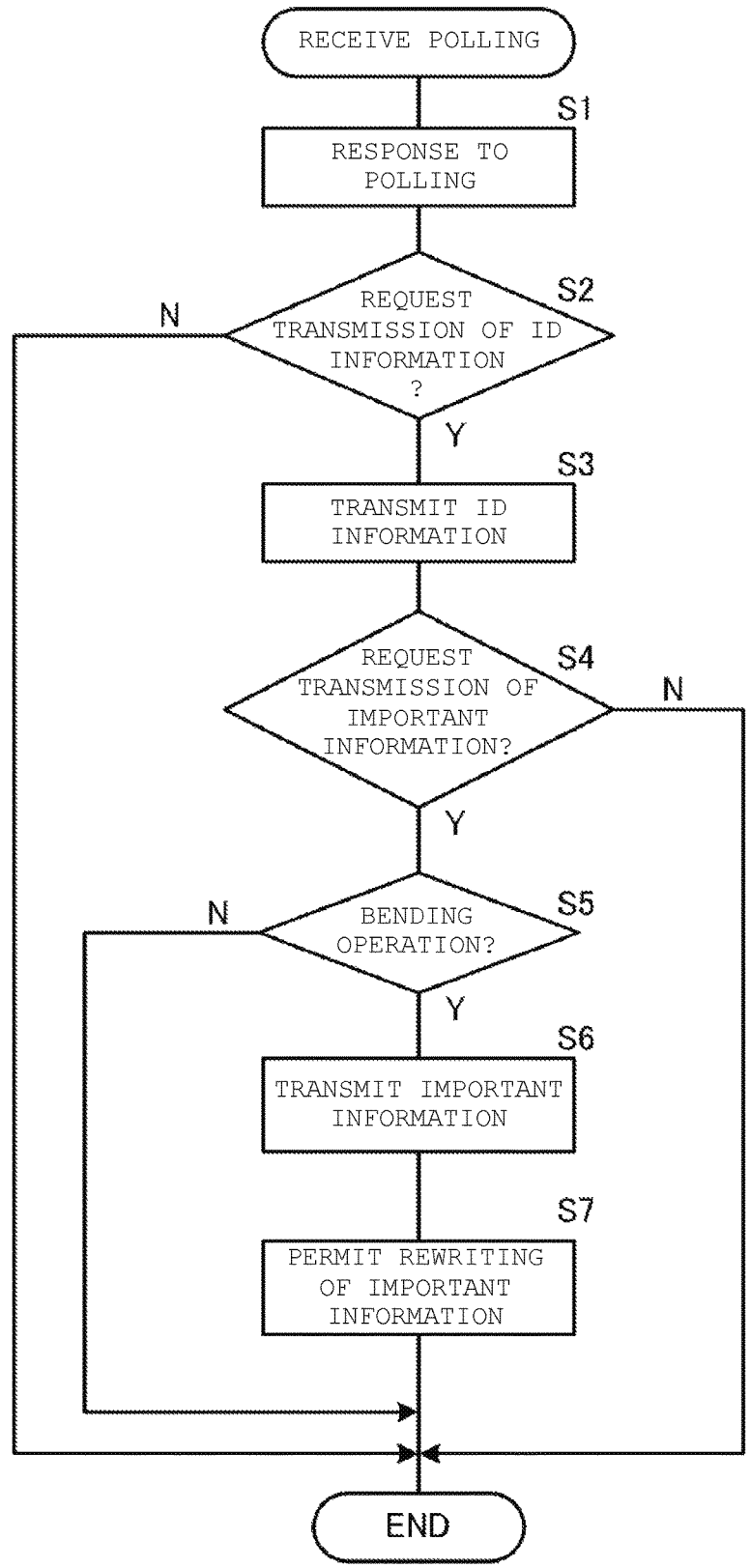
FIG. 7 is a flowchart showing an operation performed by an RFIC element 16 shown in FIG. 2.

FIG. 7 is a flowchart showing an operation performed by the RFIC element 16 shown in FIG. 2. The reader-writer device 50 transmits a polling command for requesting a response to the RFID card 10 located in a communication region in each predetermined time (e.g., in every 10 ms).

When the RFIC element 16 receives the polling command, the RFIC element 16 transmits a response to the reader-writer device 50 (S1). Thereby, the communication between the RFIC element 16 and the reader-writer device 50 starts.

It is noted that in S1, as shown in FIG. 5(A), the user assumes a scene where the RFID card 10 is placed on the spacer 51 of the reader-writer device 50.

The RFIC element 16 determines whether or not an ID request command has been transmitted from the reader-writer device 50 (S2). The ID request command is a command to request transmission of the ID information.

When the ID request command was not transmitted from the reader-writer device 50 within predetermined time (e.g. five seconds), the RFIC element 16 completes the present process. The RFIC element 16 completes the communication with the reader-writer device 50.

On the other hand, when the ID request command was transmitted from the reader-writer device 50 within the predetermined time (e.g. five seconds), the RFIC element 16 transmits the ID information (S3). When receiving the ID information, the reader-writer device 50 identifies the RFID card 10 based on the ID information.

The RFIC element 16 determines whether or not an important request command has been transmitted from the reader-writer device 50 (S4). The important request command is a command to request transmission of the important information.

In this context, the ID information is, for example, identification information indicating that the RFID card 10 corresponds to the reader-writer device 50. The important information is, for example, personal information of the user who owns the RFID card 10, a card number of the user, a validity date of the card, and the like. The personal information of the user is, for example, a birthday, an address, a phone number, and the like, of the user. It is noted that the ID information corresponds to an example of the first signal. The important information corresponds to an example of the second signal.

In S4, when the important request command was not transmitted from the reader-writer device 50 within predetermined time (e.g. five seconds), the RFIC element 16 completes the present process. The RFIC element 16 completes the communication with the reader-writer device 50.

When the important request command was transmitted from the reader-writer device 50 within the predetermined time (e.g. five seconds) in S4, the RFIC element 16 determines whether or not the substrate 11 has been bent and deformed (S5). This determination is made, for example, by the RFIC element 16 monitoring the detected voltage value detected at the signal detection terminal $V_{IN}$.

In S5, as shown in FIG. 5(B), a scene is assumed where the user bends and deforms the substrate 11 with his or her fingers.

When the RFIC element 16 determines that the substrate 11 was bent and deformed within predetermined time (e.g. five seconds), the RFIC element 16 transmits the important information to the reader-writer device 50 (S6). Accordingly, the reader-writer device 50 can use the received important information to recognize the user's personal information and settle card transaction.

Next, the RFIC element 16 permits rewriting of the important information stored in the RFIC element 16 (S7). Thereafter, when a request for rewriting important information (the user's personal information, etc.) is transmitted from the reader-writer device 50, the RFIC element 16 rewrites the important information based on the request.

On the other hand, when the RFIC element 16 determines that the substrate 11 was not bent and deformed within the predetermined time (e.g. five seconds) in S5, the RFIC element 16 completes the present process. That is, the RFIC element 16 prohibits transmission of the important information to the reader-writer device 50 and rewriting of the important information.

Hence in this configuration, unless the operation to bend and deform the substrate 11 is performed, the important information is not transmitted from the RFID card 10 to the reader-writer device 50. Thus, even if a malicious person brings the RFID card 10 of the user close to the reader-writer device 50, the malicious person cannot steal the personal information of the user or settle card transaction without permission.

Accordingly, the RFID card 10 and the RF system 100 can prevent the important information from being transmitted from the RFID card 10 to the reader-writer device 50 without the user's intention. The RFID card 10 and the RF system 100 can change the signal to be transmitted with the user's intention.

Further, the RFID card 10 and the RF system 100 can prevent the important information from being rewritten by the reader-writer device 50 without the user's intention.

Moreover, as described above, when the user does not deform the RFID card 10, the RFIC element 16 transmits the first signal to the reader-writer device 50, and when the user deforms the RFID card 10, the RFIC element 16 transmits the second signal to the reader-writer device 50. In accordance with "to deform" and "not to deform" above, the distance between the antenna coil of the reader-writer device 50 and the antenna coil 40 of the RFID card 10 changes. With this change in distance, the degree of bonding also changes, to cause deviation of a resonance frequency.

Then, the RFID card 10 includes the GND electrode 351 of the deformation sensor 35 and the shield electrode 45 around the center of the opening of the antenna coil 40. Accordingly, the RFID card 10 can offset an increase in inductance value due to being close to the antenna and a decrease in inductance value due to an eddy current generated in the GND electrode 351 and the shield electrode 45. The RFID card 10 can thus reduce the deviation of the resonance frequency which occurs in accordance with "to deform" and "not to deform."

Hereinafter, an RF system according to the second exemplary embodiment will be referred to by using the accompanying drawings.

FIG. 8 is a diagram showing a relation between a deformed state and a transmission content in the RFID card provided in the RF system according to the second embodiment. The RF system of the second embodiment is different from the RF system 100 of the first embodiment in that the transmission content differs depending on the deformed state of the substrate 11. Since the other respects are the same, the description thereof is omitted.

As described above, when the piezoelectric film 350 is deformed by the user bending the substrate 11, the deformation sensor 35 detects an electric charge, generated due to warping of the piezoelectric film 350, in the electrode 351 and the electrode 352. A signal based on this detection is inputted into the RFIC element 16 as a detection voltage $V_M$.

The detection voltage $V_M$ changes in accordance with the deformed state of the piezoelectric film 350, to take a voltage distribution as shown in FIG. 8. Hence the RFIC element 16 can detect a deformed state of the piezoelectric film 350 from the detected voltage value $V_M$. The detection voltage $V_M$ changes as shown below, for example.

When the bending deformation is +a, the detection voltage $V_M$ is a voltage value +Va as shown in FIG. 8 from the relation between the uniaxially stretching direction 901 and the bending direction (the longitudinal direction of the substrate 11). When the bending deformation is +b (<+a), the detection voltage $V_M$ is a voltage value +Vb (<+Va) as shown in FIG. 8. When +Va and +Vb are assumed to be predetermined thresholds of $+V_{th1}$ and $+V_{th2}$, a relation of $0 < +V_{th1} < +Vb < +V_{th2} < +Va$ holds.

Meanwhile, when the bending deformation is −a, namely when the bending deformation is performed in a reverse direction to +a and the bending amount is the same, the detection voltage $V_M$ is a voltage value −Va, as shown in FIG. 8. Further, when the bending deformation is −b (>−a), namely when the bending deformation is performed in a reverse direction to +b and the bending amount is the same, the detection voltage $V_M$ is a voltage value −Vb (>−Va). Similarly, the relation of these values is a relation of $0 > -V_{th1} > -Vb > -V_{th2} > -Va$.

Accordingly, by measuring the detected voltage value $V_M$, the RFIC element 16 can detect the bending direction and the bending amount. Then, the flash memory of the RFIC element 16 in the second embodiment previously stores the correspondence relation between the detected voltage value $V_M$ and the transmission content allocated to each deformed state described above.

It is noted that the card number or the card validity date corresponds to an example of the first information according to the exemplary aspect. The phone number or the address corresponds to an example of the second information according to the exemplary aspect. $+V_{th1}$ or $-V_{th1}$ corresponds to an example of the predetermined threshold according to the exemplary aspect.

Next, a description will be given of a scene where the RFID card 10 and the reader-writer device 50 of the second embodiment are brought close to each other.

Figure 9:
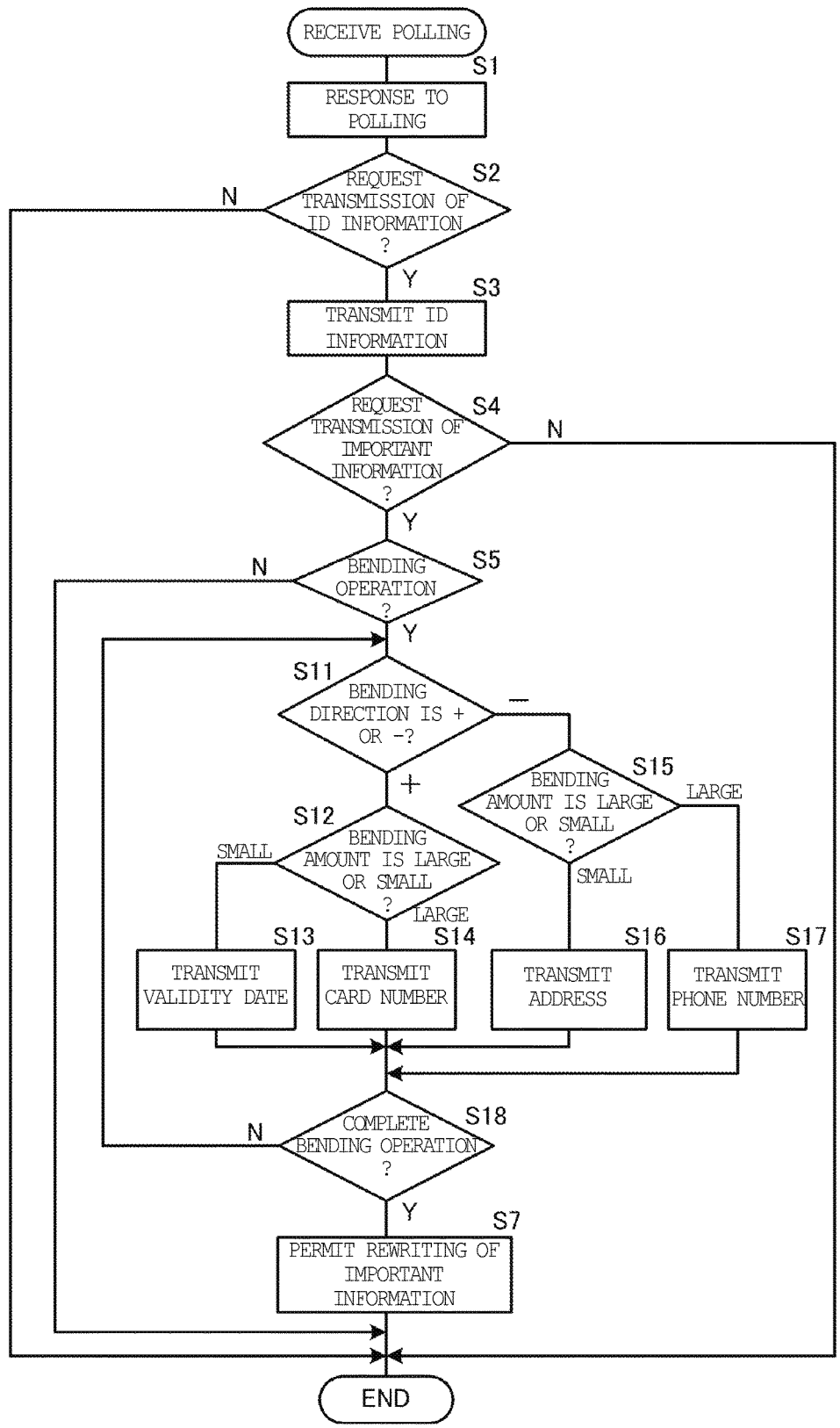
FIG. 9 is a flowchart showing an operation performed by the RFIC element 16 of the RFID card provided in the RF system according to the second embodiment.

FIG. 9 is a flowchart showing an operation performed by the RFIC element 16 of the RFID card 10 provided in the RF system according to the second embodiment. The operation performed by the RFIC element 16 of the present embodiment is the operation of S6 in FIG. 7 replaced by S11 to S18. Since the other processes (S1 to S5, S7) are the same, the description thereof is omitted.

When determining that the bending operation has been performed in S5 (Y of S5), the RFIC element 16 determines whether the bending direction is "+" or "−" based on the detection result of the deformed state (cf. FIG. 8) outputted from the deformation sensor 35 (S11).

When determining that the bending direction is "+", the RFIC element 16 determines whether the bending amount is large (+a) or small (+b) based on the detection result of the deformed state (cf. FIG. 8) outputted from the deformation sensor 35 (S12).

When determining that the bending amount is small (+b), the RFIC element 16 transmits the validity date of the RFID card 10 from the antenna coil 40 to the reader-writer device 50 (S13). On the other hand, when determining that the bending amount is large (+a), the RFIC element 16 transmits the card number of the RFID card 10 from the antenna coil 40 to the reader-writer device 50 (S14).

Meanwhile, when determining that the bending direction is "−" in S11, the RFIC element 16 determines whether the bending amount is large (−a) or small (−b) based on the detection result of the deformed state (cf. FIG. 8) outputted from the deformation sensor 35 (S15).

When determining that the bending amount is small (−b), the RFIC element 16 transmits the user's address from the antenna coil 40 to the reader-writer device 50 (S16). On the other hand, when determining that the bending amount is large (−a), the RFIC element 16 transmits the user's phone number from the antenna coil 40 to the reader-writer device 50 (S17).

The RFIC element 16 then determines whether or not the user has completed the bending operation on the substrate 11 based on the detection result of the deformed state outputted from the deformation sensor 35 (S18). When the user completes the bending operation on the substrate 11, the substrate 11 returns to the flat state as shown in FIG. 5(A). In this case, the detected voltage value $V_M$ outputted from the deformation sensor 35 is 0 [V]. Thus, in S18, the RFIC element 16 confirms whether or not the detected voltage value $V_M$ is 0 [V] to determine whether or not the user has completed the bending operation on the substrate 11.

When determining that the user has not completed the bending operation on the substrate 11 (N of S18), the RFIC element 16 returns to S11 and continues the process. In this context, for example, a scene is assumed where the user makes a small bend in the substrate 11 in the + direction, and thereafter makes a large bend in the substrate 11 in the + direction.

Meanwhile, when determining that the user has completed the bending operation on the substrate 11 (Y of S18), the RFIC element 16 moves to S7 and continues the process.

In the above configuration, similarly to the first embodiment, the RF system and the RFID card 10 of the second embodiment can prevent the important information from being transmitted from the RFID card 10 to the reader-writer device 50 without the user's intention. The RF system and the RFID card 10 of the second embodiment can change the signal to be transmitted with the user's intention.

Similarly to the first embodiment, the RF system and the RFID card 10 of the second embodiment can prevent the important information from being rewritten by the reader-writer device 50 without the user's intention.

Further, the user can change the bending direction and the bending amount of the substrate 11 to change the transmission content. The user can thus perform a diversified, intuitive bending operation on the RFID card 10.

It is noted that in the flash memory of the RFIC element 16 in the second embodiment, the transmission content as shown in FIG. 8 is allocated to each deformed state, but this is not restrictive. In implementation, a different transmission content may be allocated to each deformed state.

Hereinafter, an RF system according to a third exemplary embodiment will be referred to by using the accompanying drawings.

Figure 10:
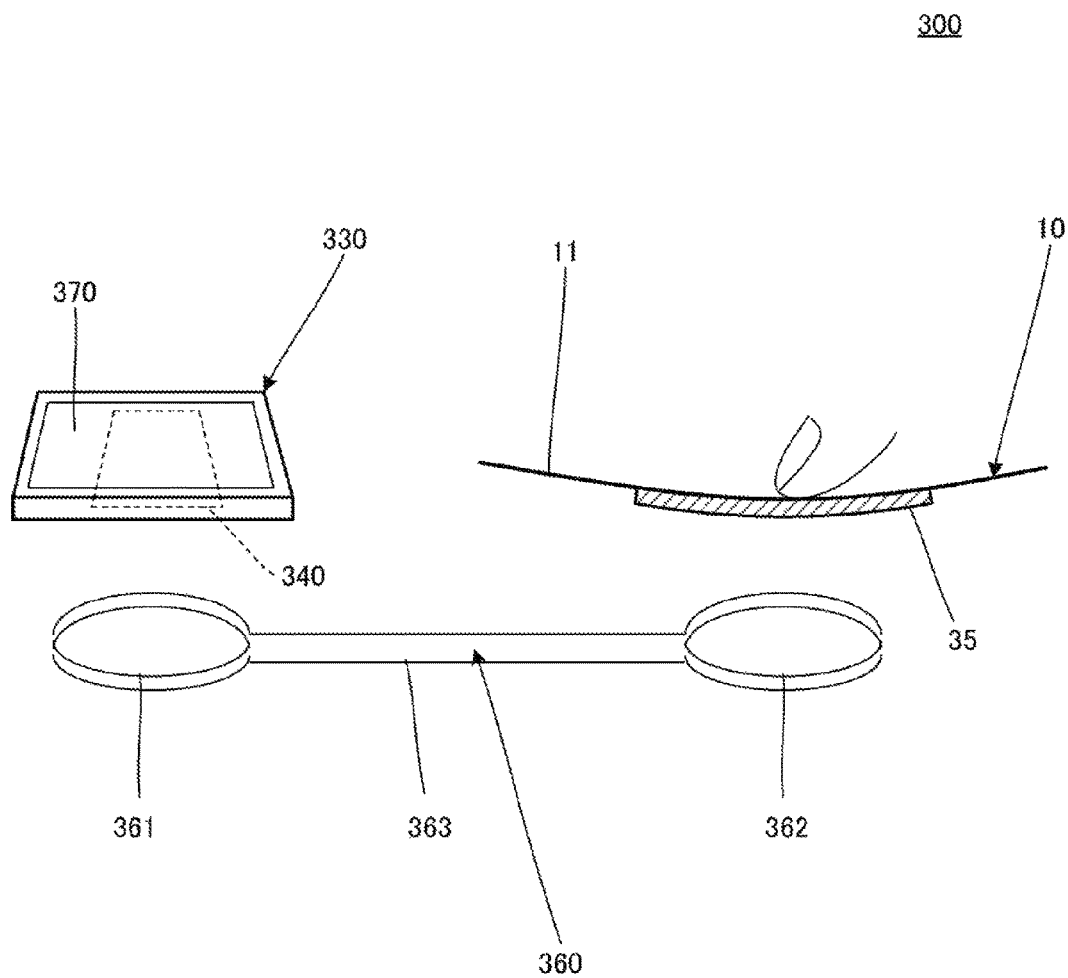
FIG. 10 is an appearance perspective view of an RF system 300 according to a third embodiment.
Figure 11:
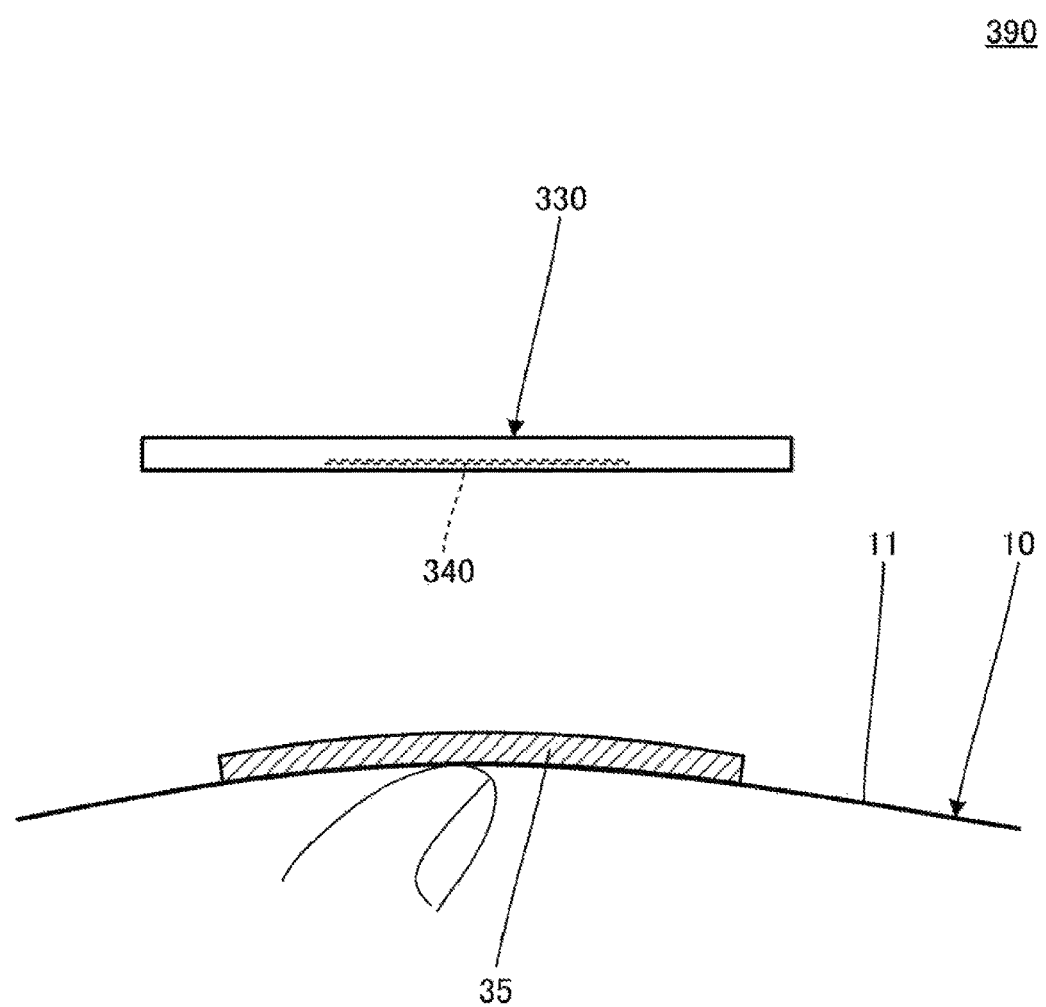
FIG. 11 is an appearance perspective view of an RF system 390 according to a modification of the third embodiment.
Figure 12:
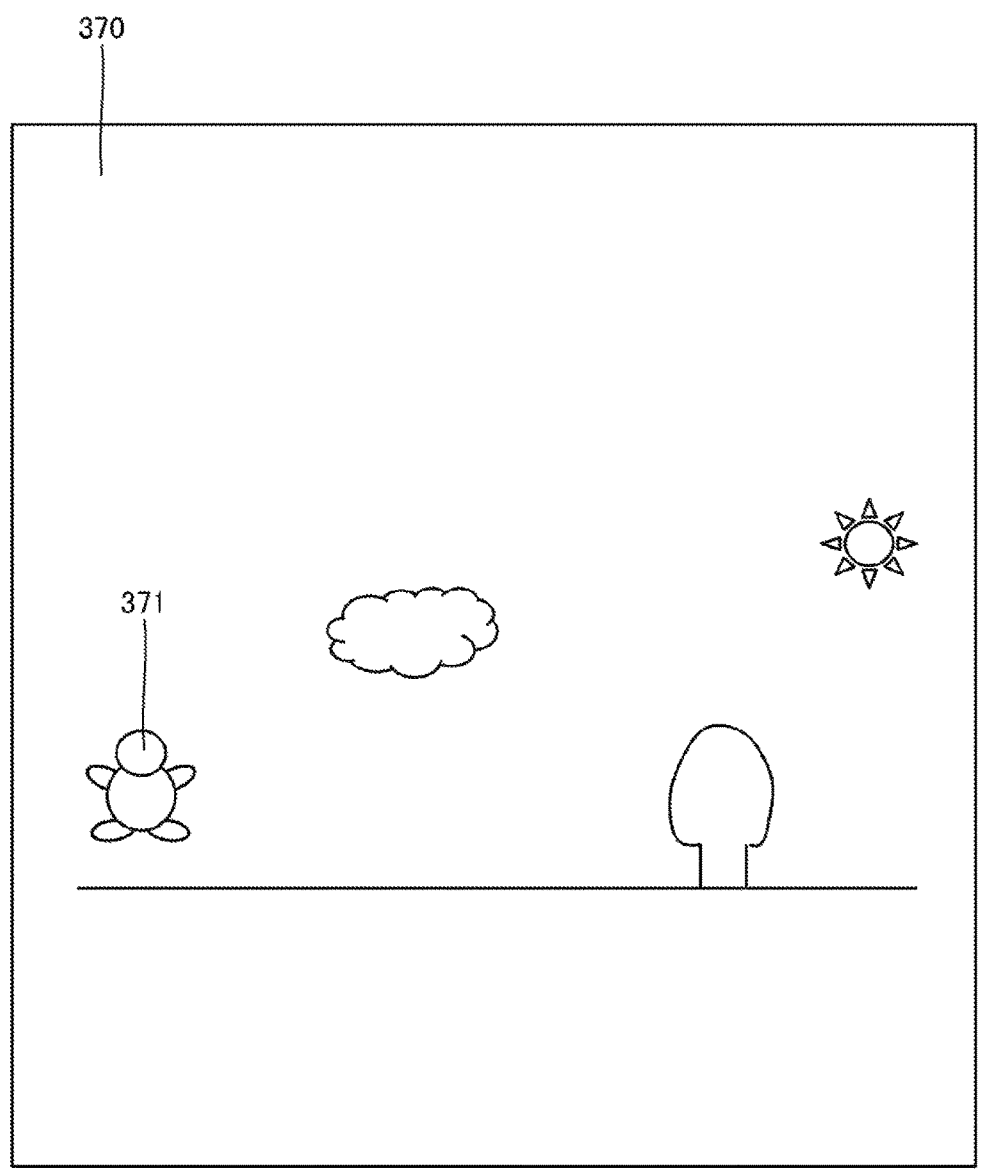
FIG. 12 is a view showing an example of a content displayed on a screen 370 when the RFID card 10 shown in FIG. 10 is not bent.
Figure 13:
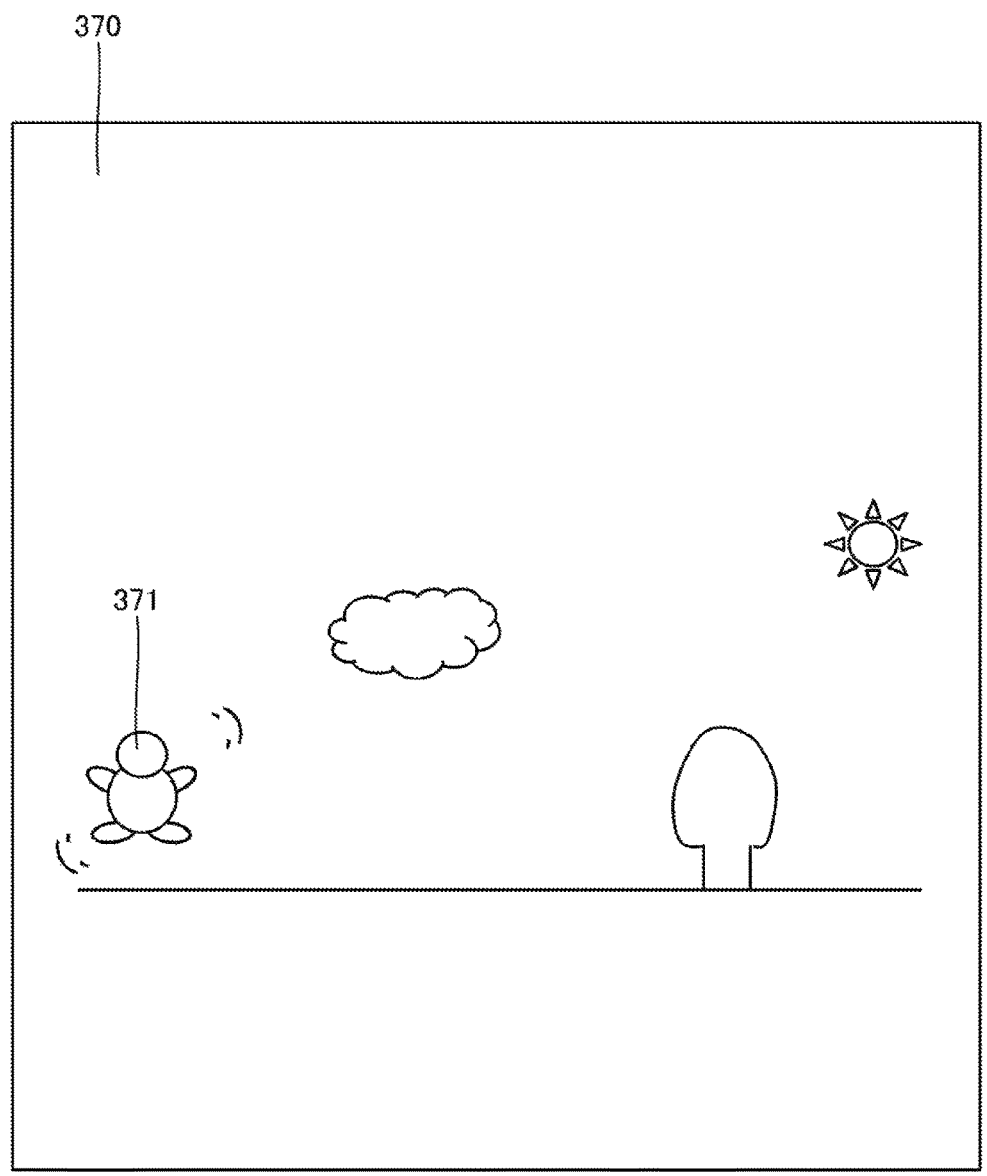
FIG. 13 is a view showing an example of a content displayed on the screen 370 when the RFID card 10 shown in FIG. 10 is bent.

FIG. 10 is an appearance perspective view of an RF system 300 according to the third exemplary embodiment. FIG. 11 is an appearance perspective view of an RF system 390 according to a modification of the third embodiment. FIG. 12 is a view showing an example of a content displayed on a screen 370 when the RFID card 10 shown in FIG. 10 is not bent. FIG. 13 is a view showing an example of a content displayed on the screen 370 when the RFID card 10 shown in FIG. 10 is bent.

The RF system 300 of the third embodiment is different from the RF system 100 of the first embodiment in terms of including a reader-writer device 330 and a relay device 360. Since the RFID card 10 is the same as that of the first embodiment, the description thereof is omitted.

The reader-writer device 330 is, for example, a smart-phone, and mounted with NFC. The reader-writer device 330 incorporates an antenna coil 340 that transmits and receives a radio signal, an RFIC element (not shown) that is connected to the antenna coil 340 and processes the radio signal, and the screen 370. In the reader-writer device 330, gaming application software is installed. A game image, for example as shown in FIG. 12, is displayed on the screen 370.

An antenna coil 340 is provided on the rear surface side of the reader-writer device 330.

However, as shown in FIG. 11, the operation to hold the RFID card 10 over the rear surface side of the reader-writer device 330 and bend and deform the RFID card 10 is difficult.

The RF system 300 then includes the relay device 360 as shown in FIG. 10. The relay device 360 includes an antenna coil 361, an antenna coil 362, and a wire 363 connecting between the antenna coil 361 and the antenna coil 362.

In this configuration, the RFIC element of the reader-writer device 330 allows a current to flow in the antenna coil 340, and when a magnetic flux is generated from the antenna coil 340, a current is generated in the antenna coil 361 by electromagnetic induction. When the current flows from the antenna coil 361 to the antenna coil 362 via the wire 363, a magnetic flux is generated from the antenna coil 362. When the magnetic flux is generated from the antenna coil 362, a current is generated in the antenna coil 40 of the RFID card 10 by electromagnetic induction.

Meanwhile, the RFIC element 16 of the RFID card 10 allows a current to flow in the antenna coil 40, and when a magnetic flux is generated from the antenna coil 40, a current is generated in the antenna coil 362 by electromagnetic induction. When the current flows from the antenna coil 362 to the antenna coil 361 via the wire 363, a magnetic flux is generated from the antenna coil 361. When the magnetic flux is generated from the antenna coil 361, a current is generated in the antenna coil 340 of the reader-writer device 330 by electromagnetic induction.

According to the above, the RFIC element of the reader-writer device 330 and the RFIC element 16 of the RFID card 10 can receive and transmit predetermined information via the relay device 360. In the RF system 300, as shown in FIG. 10, the user holds the RFID card 10 over the antenna coil 362 of the relay device 360 and performs an operation to bend and deform the RFID card 10. Hence the RF system 300 improves the usability of the user as compared with the RF system 390.

In the above configuration, when the user holds the RFID card 10 over the antenna coil 362 and does not bend or deform the RFID card 10, the RFIC element 16 transmits the first signal via the antenna coil 40. The first signal is received by the reader-writer device 330 via the relay device 360. Accordingly, for example as shown in FIG. 12, the reader-writer device 330 causes the character 371 to appear on the screen 370.

Meanwhile, when the user holds the RFID card 10 over the antenna coil 362 and bends and deforms the RFID card 10, the RFIC element 16 transmits the second signal via the antenna coil 40. The second signal is received by the reader-writer device 330 via the relay device 360. Accordingly, for example as shown in FIG. 13, the reader-writer device 330 causes the character 371 to appear on the screen 370.

According to the above, the RF system 300 and the RFID card 10 can change the signal to be transmitted with the user's intention.

Hereinafter, an RF system according to a fourth exemplary embodiment will be referred to by using the accompanying drawing.

Figure 14:
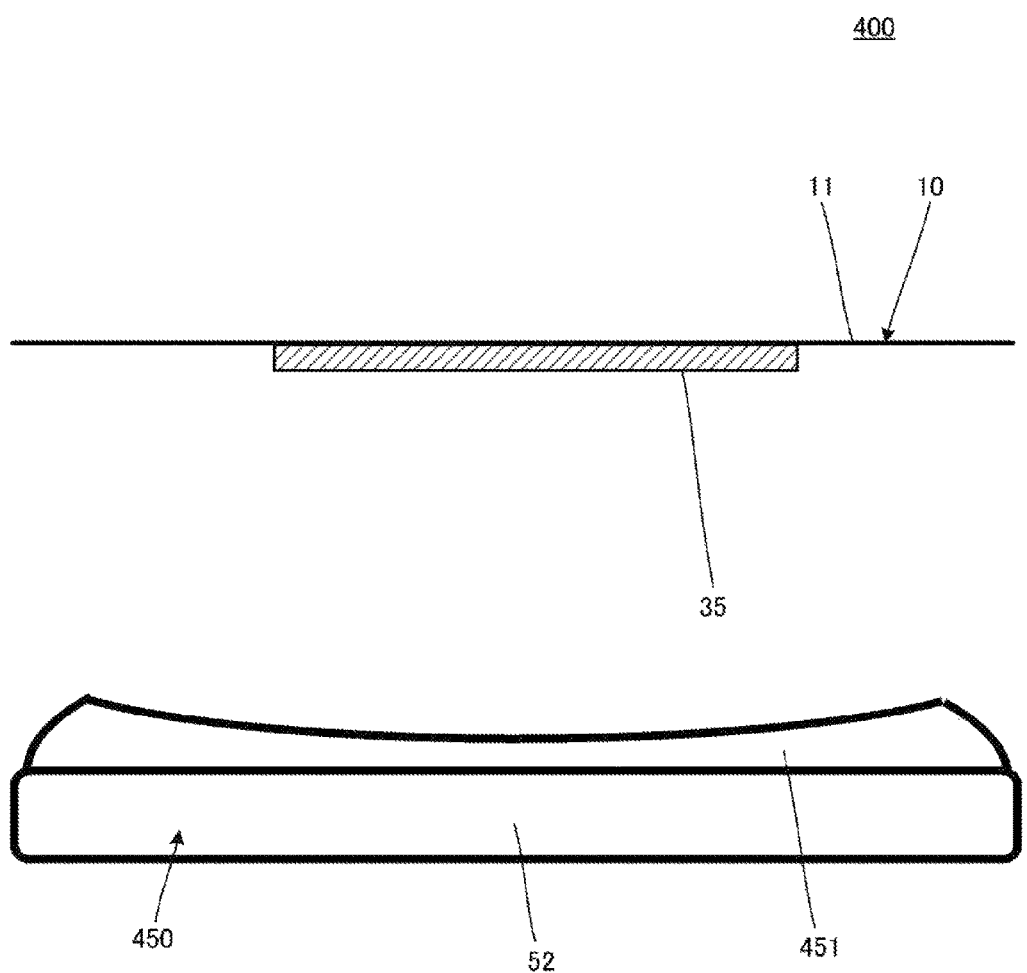
FIG. 14 is a side view of an RF system 400 according to a fourth embodiment.

FIG. 14 is a side view of an RF system 400 according to the fourth embodiment.

The RF system 400 of the fourth embodiment is different from the RF system 100 of the first embodiment in terms of a shape of a spacer 451 provided in a reader-writer device 450. The spacer 451 has a shape along the bending deformation of the RFID card 10. Since the other respects are the same as those of the first embodiment, the description thereof is omitted.

Thus, when the user places the RFID card 10 on the spacer 451 and thereafter bends the center of the substrate 11 to the body 52 side, the RFID card 10 is bent and deformed in accordance with the shape of the spacer 451.

Hence the spacer 451 can hold constant the distance between the bent and deformed RFID card 10 and the reader-writer device 450.

This can stabilize more the power supply voltage outputted from the power terminal $V_{OUT}$ of the RFIC element 16 and enables the RFIC element 16 to detect the detected voltage value at the signal detection terminal $V_{IN}$. Accordingly, the RF system 400 can detect the bending deformation of the substrate 11 with higher accuracy.

Hereinafter, an RF system according to a fifth exemplary embodiment will be referred to by using the accompanying drawing.

Figure 15:
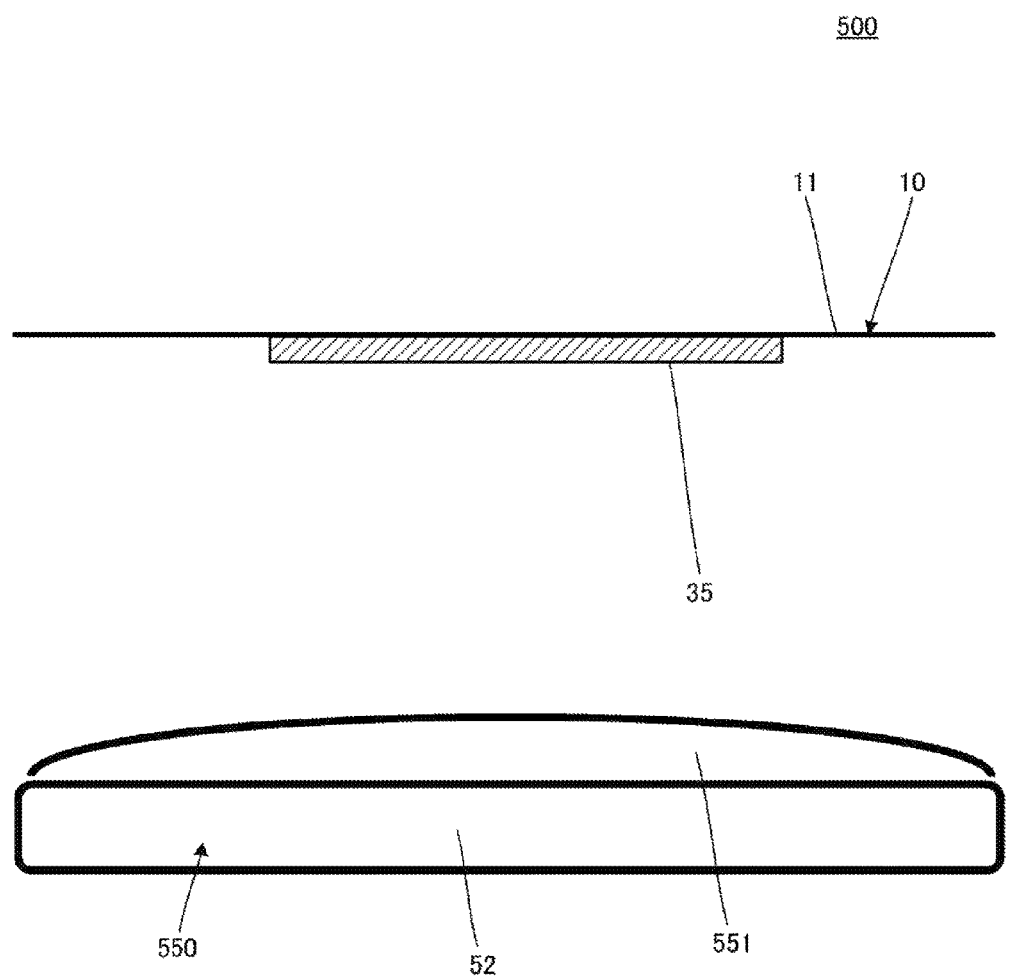
FIG. 15 is a side view of an RF system 500 according to a fifth embodiment.

FIG. 15 is a side view of an RF system 500 according to the fifth exemplary embodiment.

The RF system 500 of the fifth embodiment is different from the RF system 100 of the first embodiment in terms of a shape of a spacer 551 provided in a reader-writer device 550. The spacer 451 has a shape along the bending deformation of the RFID card 10. Since the other respects are the same as those of the first embodiment, the description thereof is omitted.

Thus, when the user places the RFID card 10 on the spacer 551 and thereafter bends the center of the substrate 11 to the body 52 side, the RFID card 10 is bent and deformed in accordance with the shape of the spacer 551.

Hence the spacer 551 can hold constant the distance between the bent and deformed RFID card 10 and the reader-writer device 550.

This can stabilize more the power supply voltage outputted from the power terminal $V_{OUT}$ of the RFIC element 16 and enables the RFIC element 16 to detect the detected voltage value at the signal detection terminal $V_{IN}$. Accordingly, the RF system 500 can detect the bending deformation of the substrate 11 with higher accuracy.

Figure 16:
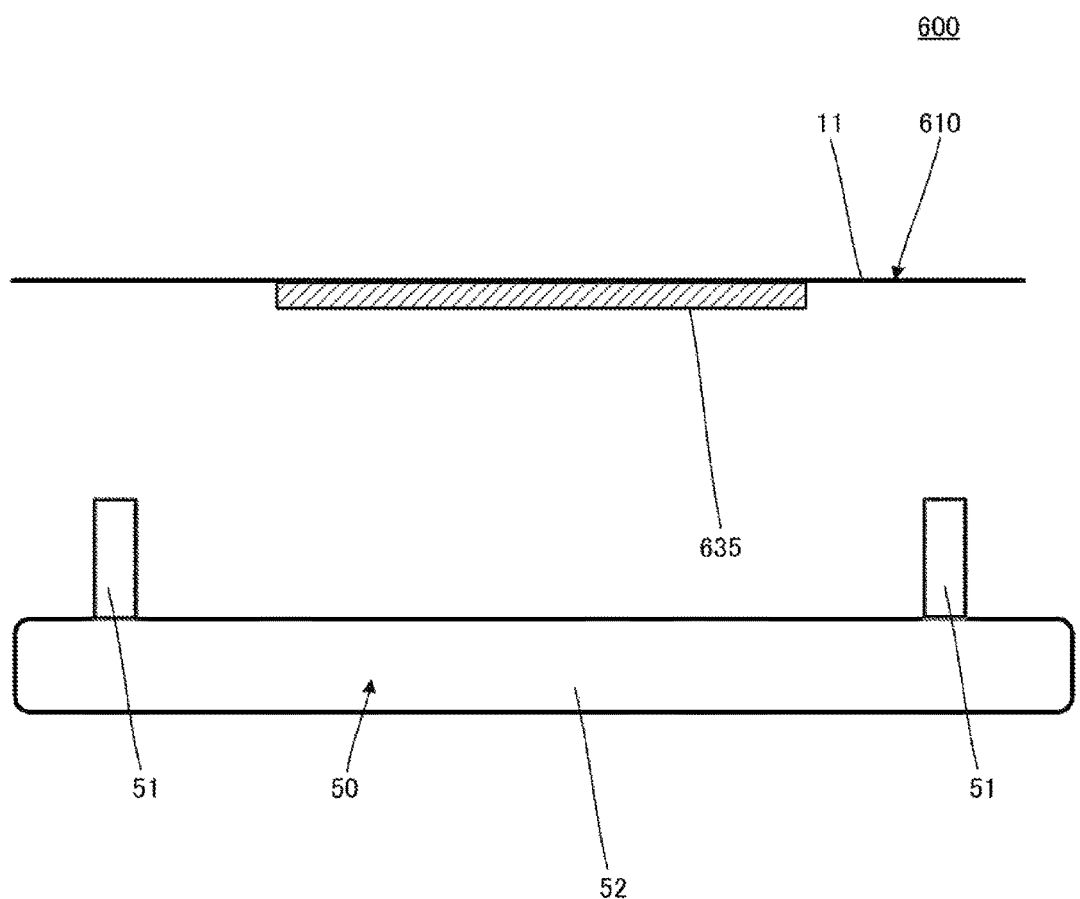
FIG. 16 is a side view of an RF system 600 according to a sixth embodiment.
Figure 17:
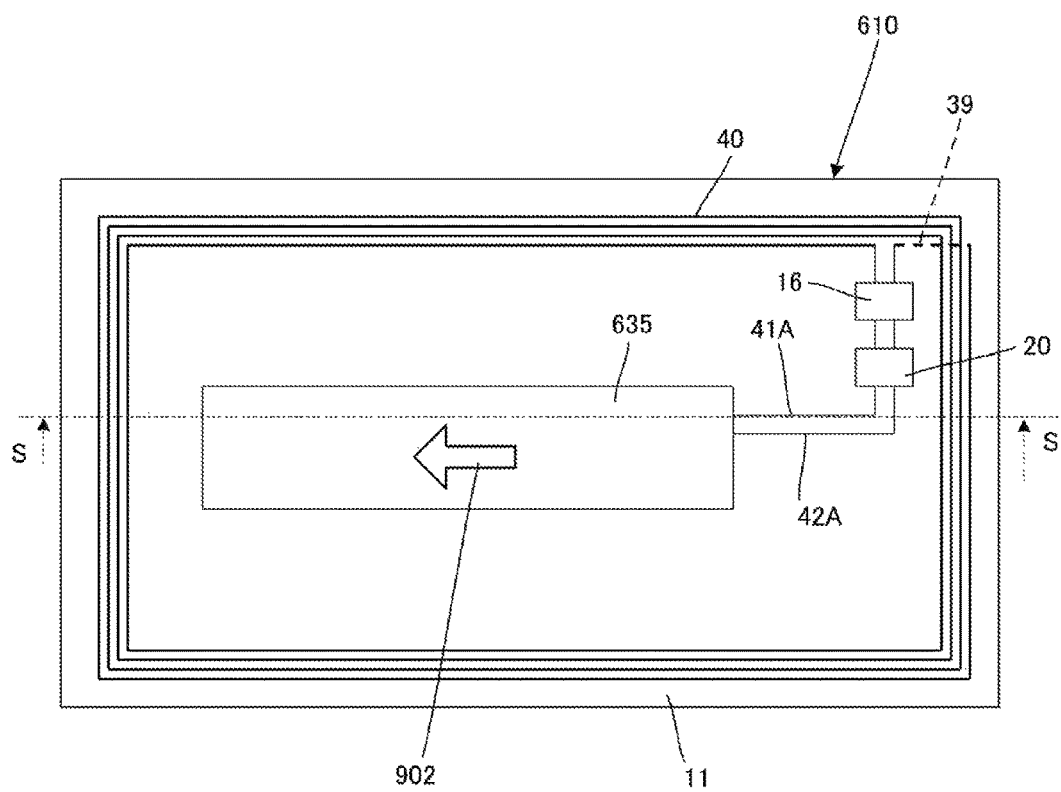
FIG. 17 is a front view of an RFID card 610 shown in FIG. 16.
Figure 18:
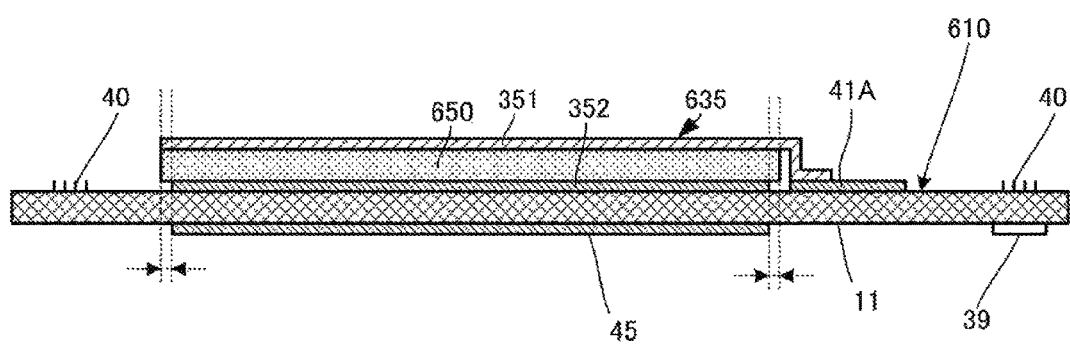
FIG. 18 is a sectional view along a line S-S shown in FIG. 17.

Hereinafter, an RF system according to a sixth exemplary embodiment will be referred to by using the accompanying drawings. FIG. 16 is a side view of an RF system 600 according to the sixth exemplary embodiment. FIG. 17 is a front view of an RFID card 610 shown in FIG. 16. FIG. 18 is a sectional view along a line S-S shown in FIG. 17.

The RF system 600 of the sixth embodiment is different from the RF system 100 of the first embodiment in terms of the RFID card 610 that includes a deformation sensor 635 for detecting twisting deformation of the substrate 11 in place of the deformation sensor 35 for detecting bending deformation of the substrate 11. The deformation sensor 635 is different from the deformation sensor 35 in terms of a piezoelectric film 650. Since the other respects of the RF system 600 are the same as those of the first embodiment, the description thereof is omitted.

It is noted that the deformation sensor 635 corresponds to an example of the holding sensor according to an exemplary aspect.

A uniaxially stretching direction 902 of the piezoelectric film 650 is different from the uniaxially stretching direction 901 of the piezoelectric film 350. The uniaxially stretching direction 902 of the piezoelectric film 650 preferably forms an angle of 45° with respect to a diagonal line of the substrate 11. The uniaxially stretching direction 902 may form an angle of 0° with respect to one of the longitudinal direction and the lateral direction of the substrate 11. However, the angle is not restricted to this, and the piezoelectric film 650 may simply be designed with an optimal angle in view of characteristics and a usage state of the piezoelectric film 650.

It is noted that the angle is not restricted to exact 45°, but may be substantially 45°. Substantially 45° is an angle including about 45°±10, for example. The above angle is one of design items, such as twisting detection accuracy, which is appropriately decided based on an application of the deformation sensor in accordance with the entire design.

In the RFID card 610, when external force that generates twisting is applied to the substrate 11, the substrate 11 is twisted around the uniaxially stretching direction 902. In this case, the piezoelectric film 650 of the deformation sensor 635 stretches or shrinks.

Hence a change occurs in the voltage outputted from the deformation sensor 635 due to the twisting deformation. This enables the RFIC element 16 to detect the twisting deformation of the substrate 11 at the signal detection terminal $V_{IN}$.

In the above configuration, when the user holds the RFID card 610 over the reader-writer device 50 and does not twist or deform the RFID card 610, the RFIC element 16 transmits the first signal to the reader-writer device 50 via the antenna coil 40.

Meanwhile, when the user holds the RFID card 610 over the reader-writer device 50 and twists and deforms the RFID card 610, the RFIC element 16 transmits the second signal to the reader-writer device 50 via the antenna coil 40.

According to the above, the RF system 600 and the RFID card 610 can change the signal to be transmitted with the user's intention. Further, the RF system 600 and the RFID card 610 can prevent the important information from being rewritten by the reader-writer device 50 without the user's intention.

Similarly to the RFID card 10, the RFID card 610 can reduce the deviation of the resonance frequency which occurs in accordance with "to deform" and "not to deform."

Hereinafter, an RF system according to a seventh exemplary embodiment will be referred to by using the accompanying drawings.

Figure 19:
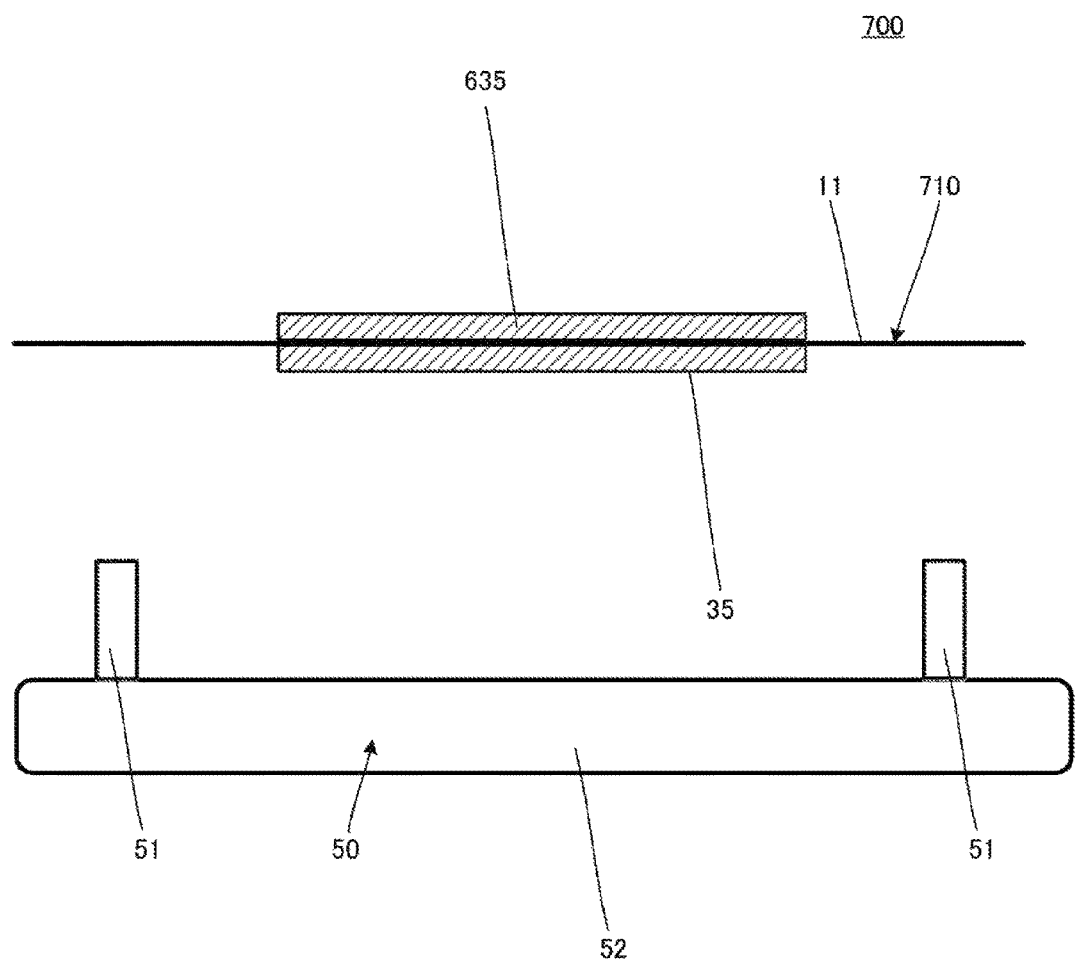
FIG. 19 is a side view of an RF system 700 according to a seventh embodiment.
Figure 20:
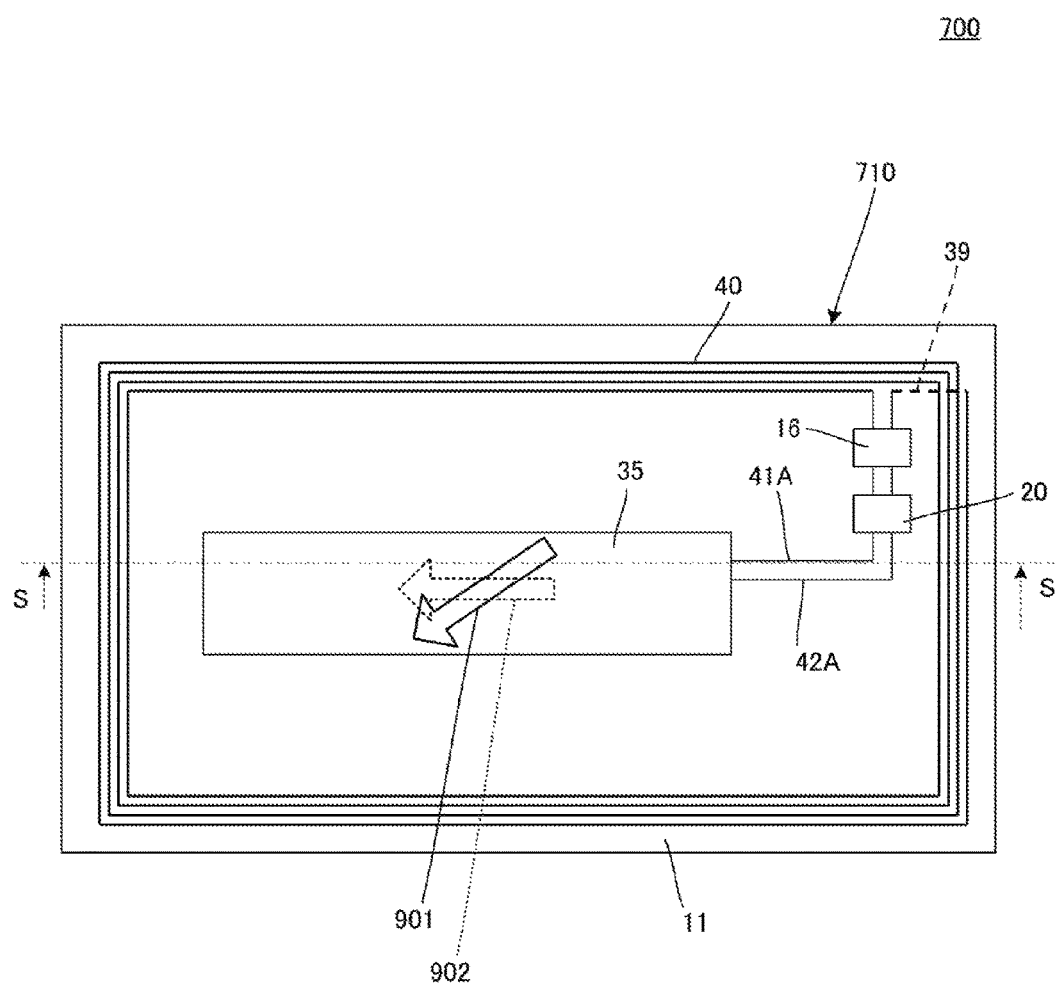
FIG. 20 is a front view of an RFID card 710 shown in FIG. 19.
Figure 21:
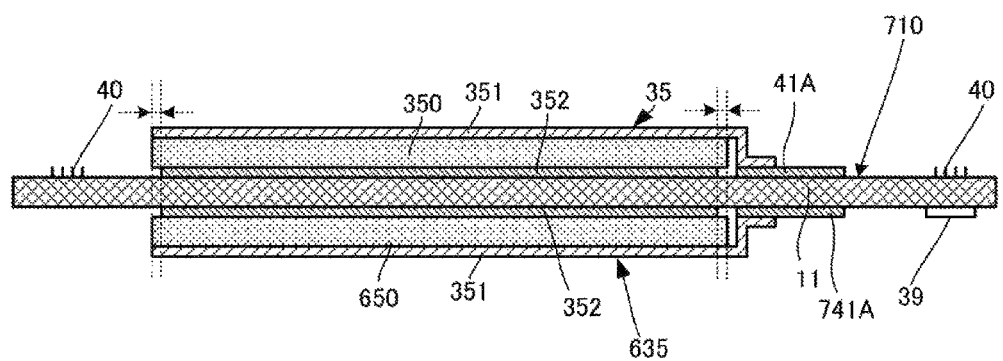
FIG. 21 is a sectional view along a line S-S shown in FIG. 20.
Figure 22:
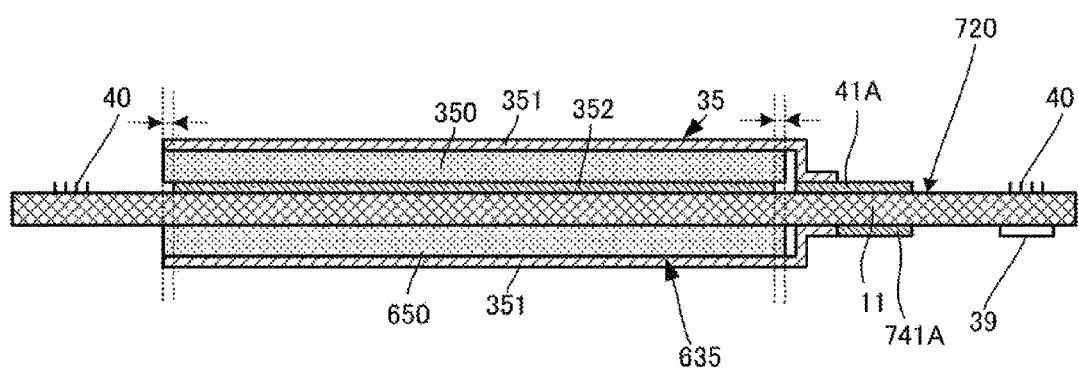
FIG. 22 is a sectional view along a line S-S on an RFID card 720 according to a modification of the RFID card 710 shown in FIG. 21.

FIG. 19 is a side view of an RF system 700 according to the seventh exemplary embodiment. FIG. 20 is a front view of an RFID card 710 shown in FIG. 19. FIG. 21 is a sectional view along a line S-S shown in FIG. 20. FIG. 22 is a sectional view along a line S-S on an RFID card 720 according to a modification of the RFID card 710 shown in FIG. 21.

The RF system 700 of the seventh embodiment is different from the RF system 100 of the first embodiment in terms of the RFID card 710 that includes both the deformation sensor 35 for detecting bending deformation of the substrate 11 and the deformation sensor 635 for detecting twisting deformation of the substrate 11. Since the other respects of the RF system 700 are the same as those of the first embodiment and the sixth embodiment, the description thereof is omitted.

In the above configuration, when the user holds the RFID card 710 over the reader-writer device 50 and performs neither the twisting deformation nor the bending deformation on the RFID card 710, the RFIC element 16 transmits the first signal to the reader-writer device 50 via the antenna coil 40.

Meanwhile, when the user holds the RFID card 710 over the reader-writer device 50 and performs at least one of the twisting deformation and the bending deformation on the RFID card 710, the RFIC element 16 transmits the second signal to the reader-writer device 50 via the antenna coil 40.

In this context, when the user holds the RFID card 710 over the reader-writer device 50 and performs the bending deformation on the RFID card 710, the RFIC element 16 may transmit the second signal to the reader-writer device 50 via the antenna coil 40, and when the user performs the twisting deformation on the RFID card 710, the RFIC element 16 may transmit a third signal to the reader-writer device 50 via the antenna coil 40.

According to the above, the RF system 700 and the RFID card 710 can change the signal to be transmitted with the user's intention. Further, similarly to the first embodiment, the RF system 700 and the RFID card 710 can prevent the important information from being rewritten by the reader-writer device 50 without the user's intention.

Moreover, similarly to the RFID card 10, the RFID card 710 can reduce the deviation of the resonance frequency which occurs in accordance with "to deform" and "not to deform."

Although two signal electrodes 352 are formed on both main surfaces of the substrate 11 as shown in FIG. 21 in the present embodiment, this is not restrictive. In implementation, as shown in FIG. 22, one signal electrode 352 may be formed on one main surface of the substrate 11, and two deformation sensors 35, 635 may both serve as one signal electrode 352.

The configuration of the former shown in FIG. 21 enables detection of the bending deformation and the twisting deformation with high accuracy as compared with the configuration of the latter shown in FIG. 22. Meanwhile, the configuration of the latter shown in FIG. 22 can make the thickness small as compared with the configuration of the former shown in FIG. 21. The configuration of the latter shown in FIG. 22 can detect the bending deformation and the twisting deformation.

Hereinafter, an RF system according to an eighth exemplary embodiment will be referred to by using the accompanying drawings.

Figure 23:
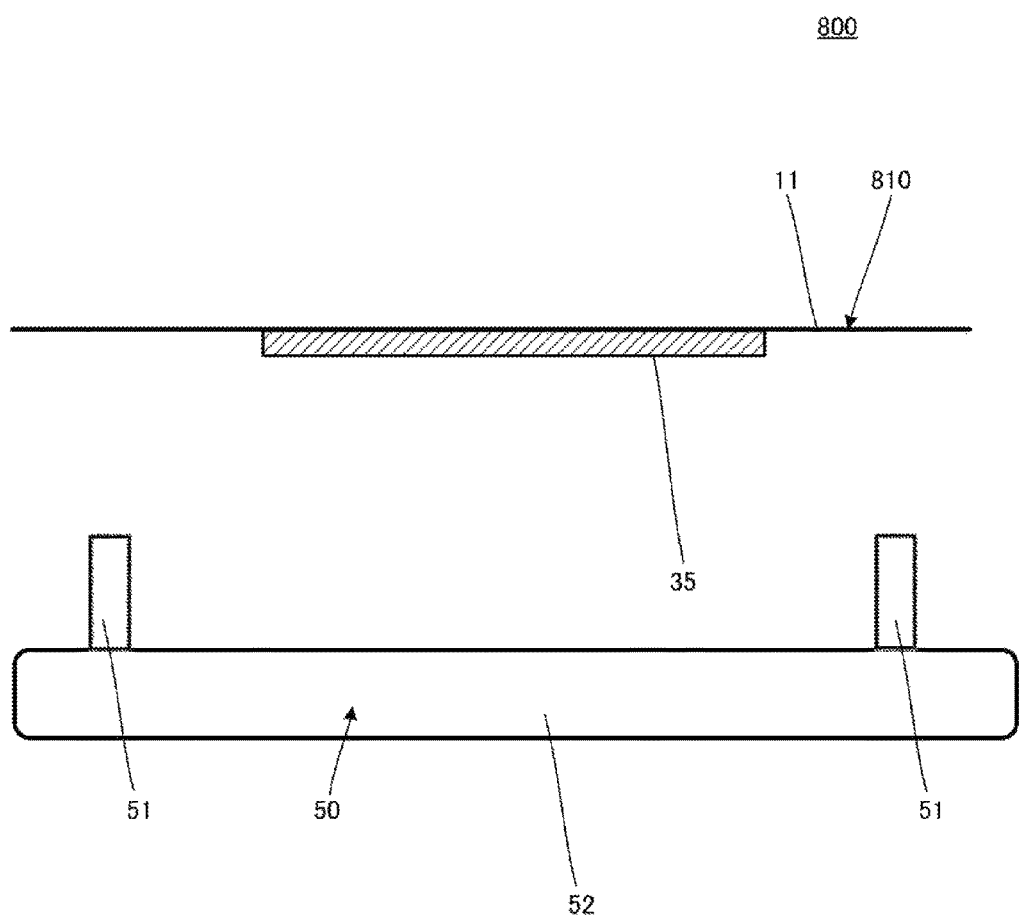
FIG. 23 is a side view of an RF system 800 according to an eighth embodiment.
Figure 24:
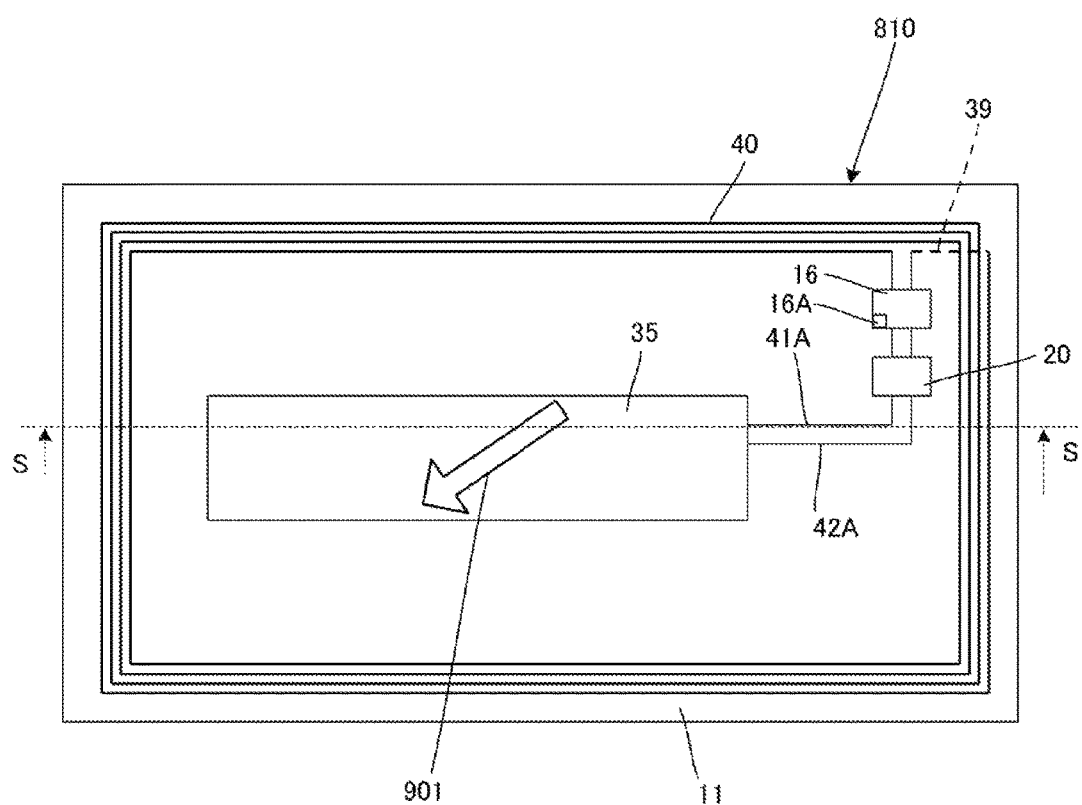
FIG. 24 is a front view of an RFID card 810 shown in FIG. 23.

FIG. 23 is a side view of an RF system 800 according to the eighth exemplary embodiment. FIG. 24 is a front view of an RFID card 810 shown in FIG. 23.

The RF system 800 of the eighth embodiment is different from the RF system 100 of the first embodiment in that the RFIC element 16 stores a biological tremor program 16A in the flash memory. Since the other respects of the RF system 800 are the same as those of the first embodiment and the sixth embodiment, the description thereof is omitted.

It is noted that in the present embodiment, the deformation sensor 35 will be hereinafter referred to as a holding sensor 35 since having a property of detecting a holding state in which the biological body holds the RFID card 810.

In the RF system 800, the RFIC element 16 operates as follows in accordance with the biological tremor program 16A. That is, the RFIC element 16 records a voltage value outputted from the holding sensor 35 as a signal on a temporal axis. Further, the RFIC element 16 converts the signal on the temporal axis of the voltage value to a signal on a frequency axis. The RFIC element 16 determines the presence or absence of the holding state where the biological body holds the RFID card 810 based on the signal on the frequency axis.

In this context, when the user's finger is in touch with the RFID card 810, the voltage outputted from the holding sensor 35 to the RFIC element 16 shows a voltage variation (minute vibration) of a constant frequency.

In the biological body, a mechanical minute vibration of muscles (a biological tremor) occurs as a physiological phenomenon. The biological tremor is a tremor with a constant frequency in a predetermined frequency band (e.g., a band of about 5 Hz to 20 Hz). Just by the user's finger coming into touch with the RFID card 810, the biological tremor is transferred to the piezoelectric film 350.

Thus, when the voltage outputted from the holding sensor 35 minutely vibrates at a frequency of about 5 Hz to 20 Hz, the RFIC element 16 determines that the holding sensor 35 has detected the holding state where the biological body holds the RFID card 810.

Further, the biological tremor is a phenomenon unique to the biological body. Even if a voltage is detected by an object other than the biological body touching the RFID card 810, when a frequency component cannot be detected in a predetermined frequency band, the RFIC element 16 determines that the holding sensor 35 has not detected the holding state.

In the above configuration, when the user does not hold the substrate 11, the RFIC element 16 transmits the first signal to the reader-writer device 50 via the antenna coil 40.

On the other hand, when the user holds the substrate 11, the RFIC element 16 transmits the second signal to the reader-writer device 50 via the antenna coil 40.

Hence in this configuration, unless the user holds the substrate 11, the important information is not transmitted from the RFID card 810 to the reader-writer device 50. Thus, even if a malicious person brings the RFID card 810 of the user close to the reader-writer device 50, the malicious person cannot steal the personal information of the user or settle card transaction without permission.

Accordingly, the RFID card 810 and the RF system 800 can prevent the important information from being transmitted from the RFID card 810 to the reader-writer device 50 without the user's intention. The RF system 800 and the RFID card 810 can change the signal to be transmitted with the user's intention. Further, similarly to the first embodiment, the RF system 800 and the RFID card 810 can prevent the important information from being rewritten by the reader-writer device 50 without the user's intention.

Moreover, in the RF system 800 and the RFID card 810, the user does not need to perform the bending deformation or the twisting deformation on the substrate 11. This eliminates the need for the substrate 11 of the RFID card 810 to necessarily have flexibility. Accordingly, the RF system 800 and the RFID card 810 have an advantage of not being damaged due to repetition of the bending deformation and the twisting deformation.

It is noted that the holding sensor 35 mainly detects a biological signal in an ELF (extremely low frequency) band (3 Hz to 30 Hz). For this reason, even when the holding sensor 35 is disposed in the vicinity of the antenna coil 40 that uses a signal in an HF (high frequency) band (3 MHz to 30 MHz), the holding sensor 35 and the antenna coil 40 are free of mutual interference such as erroneous detection and reading failure. The holding sensor 35 and the antenna coil 40 are free of mutual interference such as erroneous detection and reading failure even when no filter is provided. This enables reduction in size of the RFID card 810.

In the RF system 800 shown in FIG. 23, the RFIC element 16 detects only the foregoing holding state by using the holding sensor 35, but this is not restrictive. In implementation, in the RF system 800 shown in FIG. 23, the RFIC element 16 may detect both the holding state and the bending deformation described above by using the holding sensor 35.

For example, when the holding sensor 35 detects the holding state, the RFIC element 16 transmits the first signal to the reader-writer device 50 via the antenna coil 40.

Meanwhile, when the holding sensor 35 detects the holding state and the bending deformation, the RFIC element 16 transmits the second signal to the reader-writer device 50 via the antenna coil 40.

In this case, when the substrate 11 is bent accidentally, the RFID card 810 and the RF system 800 can prevent the important information from being transmitted from the RFID card 810 to the reader-writer device 50.

Similarly, in the RF system 600 shown in FIG. 16, the RFIC element 16 may store the biological tremor program 16A in the flash memory and detect both the foregoing holding state and twisting deformation by using the holding sensor 635. Further, in the RF system 700 shown in FIG. 19, the RFIC element 16 may store the biological tremor program 16A in the flash memory and detect three foregoing items, the holding state, the bending deformation, and the twisting deformation, by using two holding sensors 35, 635.

Although the RFID card 10 is assumed to be molded with a hard material such as plastic in each of the above embodiments, this is not restrictive. In implementation, the RFID card 10 may be formed using a soft material like a film, for example. The RFID card 10 may, for example, be in the form of being incorporated in a toy such as a stuffed toy while keeping the softness like a film, and detecting a deformation amount of the stuffed toy to transit that information to the master unit in real time. In this case, the incorporated RFID 10 can serve as an input device of the master unit. Other than the above, the RFID card 10 may be disposed in a wearable terminal such as a flexible smartphone or a smart watch, while keeping the softness like a film.

Although each of the deformation sensors 35, 635 is made of the piezoelectric film 350 in each of the above embodiments, this is not restrictive. In implementation, for example, it may be made up of piezoelectric ceramic or the like.

Finally, the description of each of the above embodiments should be considered as being illustrative in all respects and not being restrictive. The scope of the present invention is shown not by the foregoing embodiment but by the claims. Further, the scope of the present invention is intended to include meanings equivalent to the claims and all changes in the scope.

DESCRIPTION OF REFERENCE SYMBOLS

10: RFID card
11: substrate
16: RFIC element
20: analog circuit
35: deformation sensor (holding sensor)
39: wire
40: antenna coil
41A, 42A: wire
45: shield electrode
50: reader-writer device
51: spacer
52: body
100, 300: RF system
330: reader-writer device
340: antenna coil
350: piezoelectric film
351: GND electrode
352: signal electrode
360: relay device
361, 362: antenna coil
363: wire
370: screen
371: character
390: RF system
400: RF system
450: reader-writer device
451: spacer
500: RF system
545: shield electrode
550: reader-writer device
551: spacer
600: RF system
610: RFID card
635: deformation sensor (holding sensor)
650: piezoelectric film 700: RF system
710, 720: RFID card
800: RF system
810: RFID card
901, 902: uniaxially stretching direction

The invention claimed is:

1. A radio frequency (RF) module comprising:
a substrate;
a holding sensor disposed on the substrate and configured to detect a holding state of the substrate by a user of the RF module;
an antenna disposed on the substrate; and
a radio frequency integrated circuit (RFIC) element coupled to the antenna,
wherein the RFIC element is configured to transmit, via the antenna, first and second signals comprising at least a portion of different information with respect to each other, with the second signal being transmitted only upon the holding sensor detecting that the RF module is being held by the user.

2. The RF module according to claim 1, wherein the RFIC element transmits, via the antenna, the first signal when the holding sensor does not detect that the RF module is being held by the user.

3. The RF module according to claim 2,
wherein the holding sensor is configured to detect bending deformation of the substrate, and
wherein the RFIC element transmits the first signal via the antenna when the holding sensor does not detect the bending deformation of the substrate, and the RFIC element transmits the second signal via the antenna when the holding sensor detects the bending deformation of the substrate.

4. The RF module according to claim 3,
wherein the holding sensor is configured to detect a bending amount of the substrate, and
wherein the RFIC element transmits the second signal via the antenna when the holding sensor detects the bending amount of the substrate is greater than or equal to a predetermined threshold.

5. The RF module according to claim 3,
wherein the holding sensor is configured to detect first and second bending directions of the substrate,
wherein the RFIC element stores first information and second information associated with respective first and second bending directions of the substrate,
wherein the second signal comprises the second information, and
wherein the RFIC element transmits the second information upon the holding sensor detecting the second bending direction of the substrate.

6. The RF module according to claim 2,
wherein the holding sensor is configured to detect twisting deformation of the substrate, and
wherein the RFIC element transmits the first signal via the antenna when the holding sensor does not detect the twisting deformation of the substrate, and the RFIC element transmits the second signal via the antenna when the holding sensor detects the twisting deformation of the substrate.

7. The RF module according to claim 2,
wherein the holding sensor is configured to detect minute vibration of the user in response to the user touching the substrate, and
wherein the RFIC element transmits the first signal via the antenna when the holding sensor does not detect the minute vibration, and the RFIC element transmits the second signal via the antenna when the holding sensor detects the minute vibration.

8. The RF module according to claim 7, wherein the minute vibration is a tremor of a biological body of the user.

9. The RF module according to claim 1, wherein the holding sensor includes a piezoelectric film, and the piezoelectric film is pasted to one main surface of the substrate.

10. The RF module according to claim 1, wherein the substrate has flexibility.

11. The RF module according to claim 1, wherein the antenna includes an antenna coil disposed on the substrate, and the holding sensor is disposed at an inner periphery side of the antenna coil on the substrate.

12. The RF module according to claim 1, wherein the holding sensor comprises a piezoelectric film that is uniaxially stretched and has a rectangular shape, and a uniaxially stretching direction of the piezoelectric film is an angle of 45°±10 with respect to one of a longitudinal direction and a lateral direction of the piezoelectric film.

13. The RF module according to claim 12, wherein the piezoelectric film consists of L-polylactic acid (PLLA).

14. The RF module according to claim 1, wherein the antenna includes an antenna coil disposed on a surface of the substrate, and the holding sensor includes a signal electrode disposed on the surface of the substrate.

15. An RF system comprising:
an RF module comprising:
a substrate;
a holding sensor disposed on the substrate and configured to detect a holding state of the substrate by a user of the RF module;
an antenna disposed on the substrate; and
a radio frequency integrated circuit (RFIC) element coupled to the antenna; and
a communication device configured to perform radio communication with the RF module and to receive one of the first signal and the second signal transmitted from the RFIC element,
wherein the RFIC element is configured to transmit to the communication device, via the antenna, the second signal only upon the holding sensor detecting that the RF module is being held by the user.

16. The RF system according to claim 15, wherein the RFIC element transmits to the communication device, via the antenna, the first signal when the holding sensor does not detect that the RF module is being held by the user.

17. The RF system according to claim 15,
wherein the holding sensor is configured to detect bending deformation and a bending amount of the substrate when the RF module is being held by the user, and
wherein the RFIC element transmits the second signal via the antenna when the holding sensor detects the bending amount of the substrate is greater than or equal to a predetermined threshold.

18. The RF system according to claim 15,
wherein the holding sensor is configured to detect a bending deformation and first and second bending directions of the substrate,
wherein the RFIC element stores first information and second information associated with respective first and second bending directions of the substrate,
wherein the second signal comprises the second information, and
wherein the RFIC element transmits the second information upon the holding sensor detecting the second bending direction of the substrate.

19. The RF system according to claim 15, wherein the communication device further comprises a spacer disposed on a body of the communication device and extends therefrom.

20. The RF system according to claim 19, wherein the spacer has a first portion having a thickness that is different from a thickness at a second potion of the spacer.

* * * * *